Fig. 12

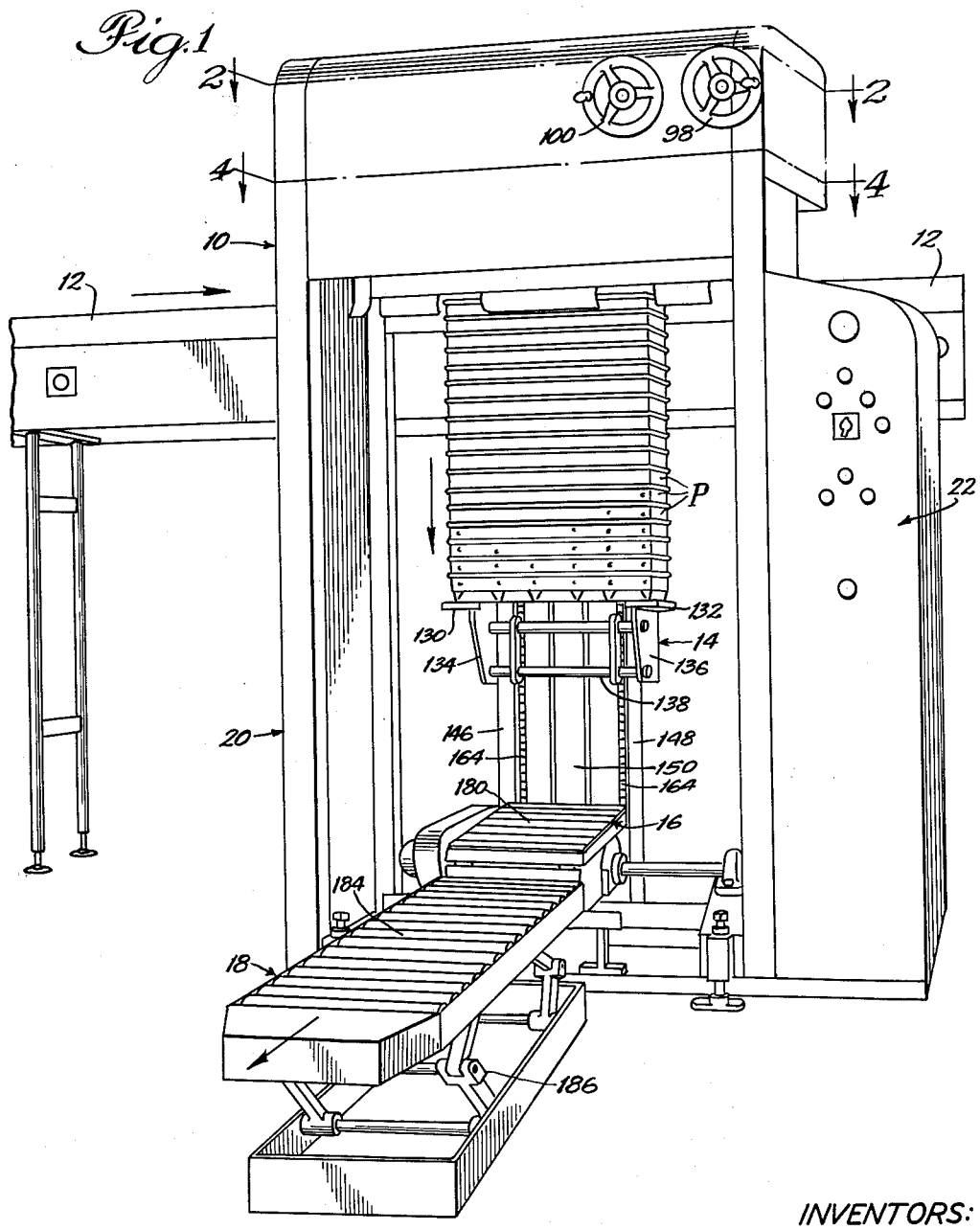

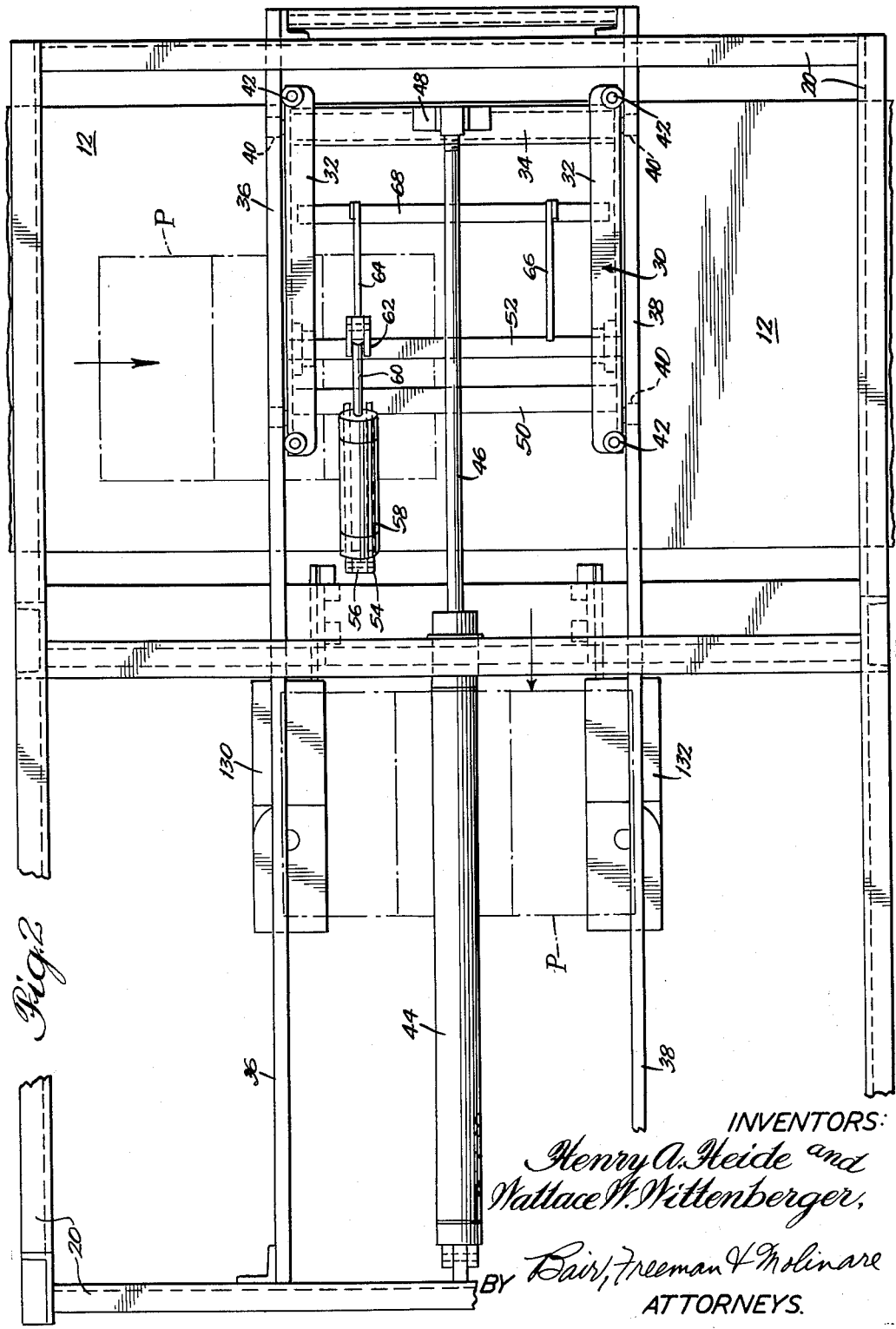

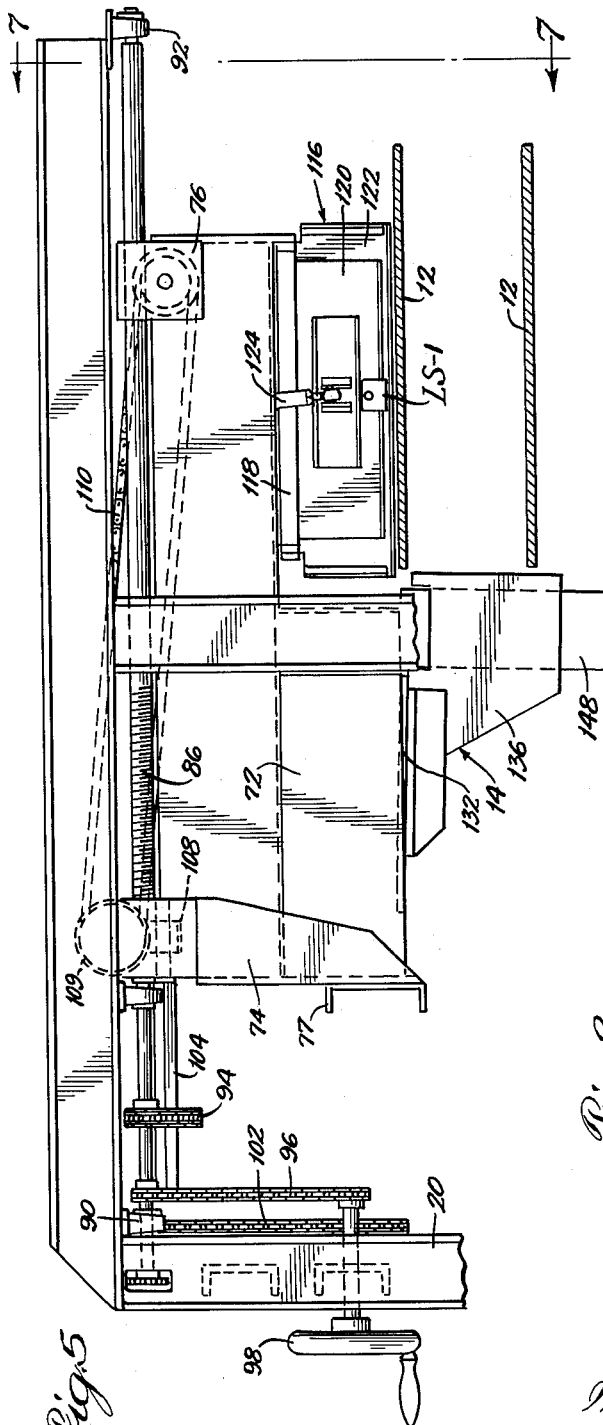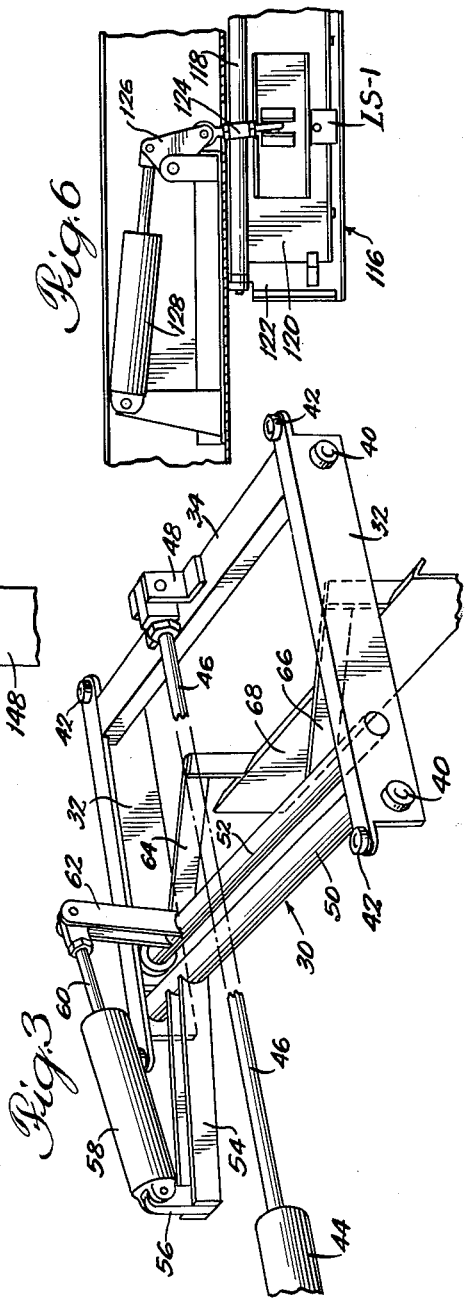

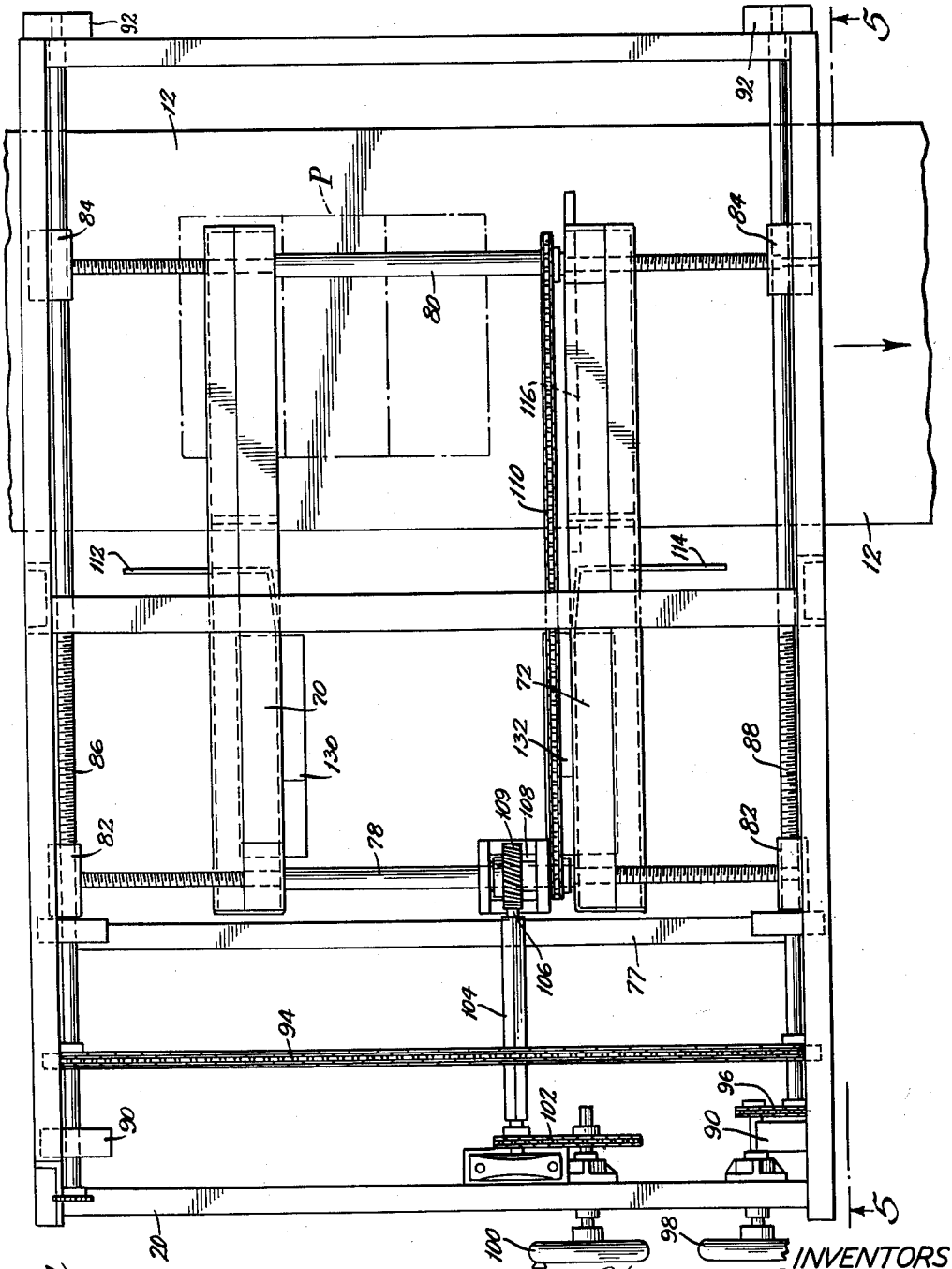

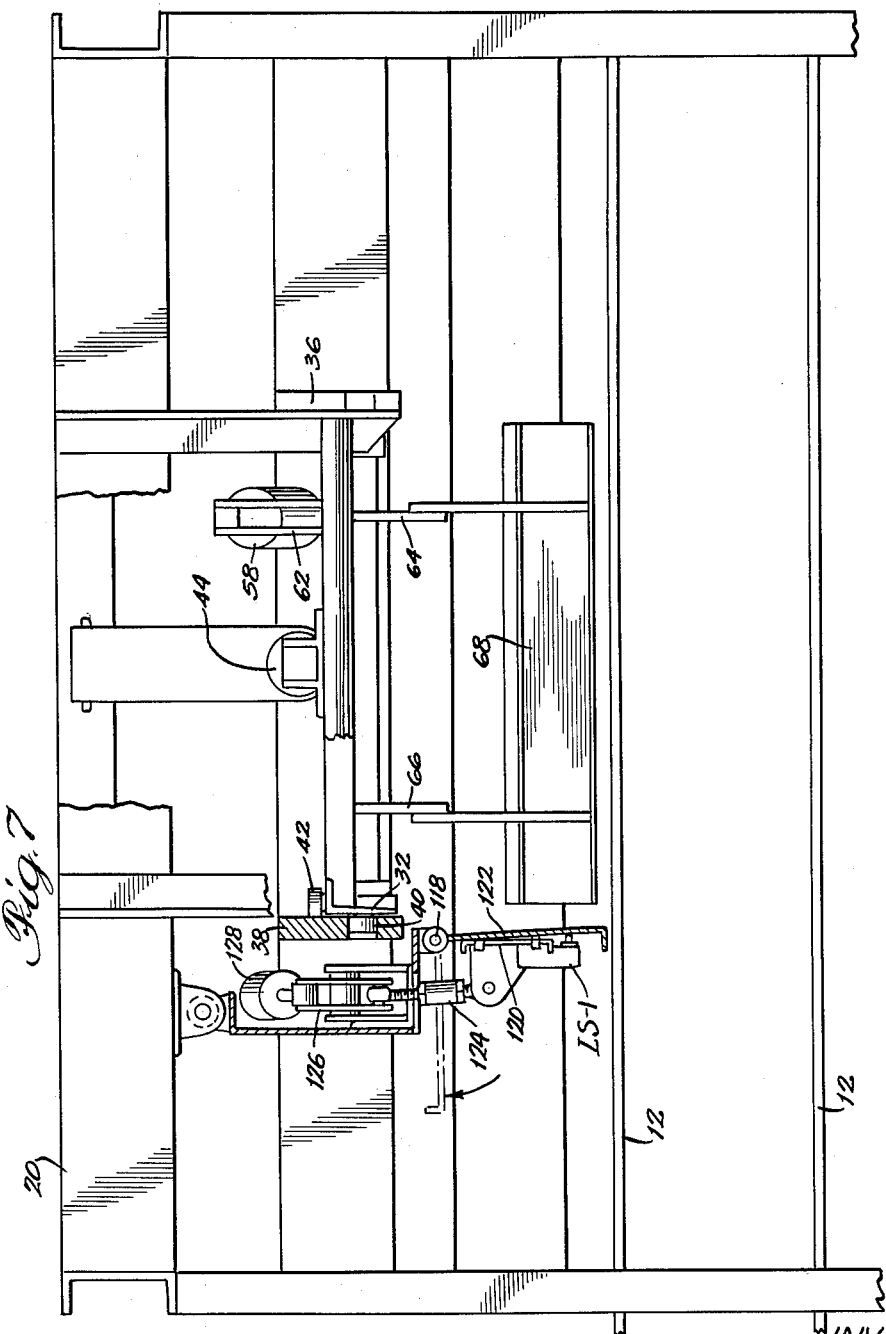

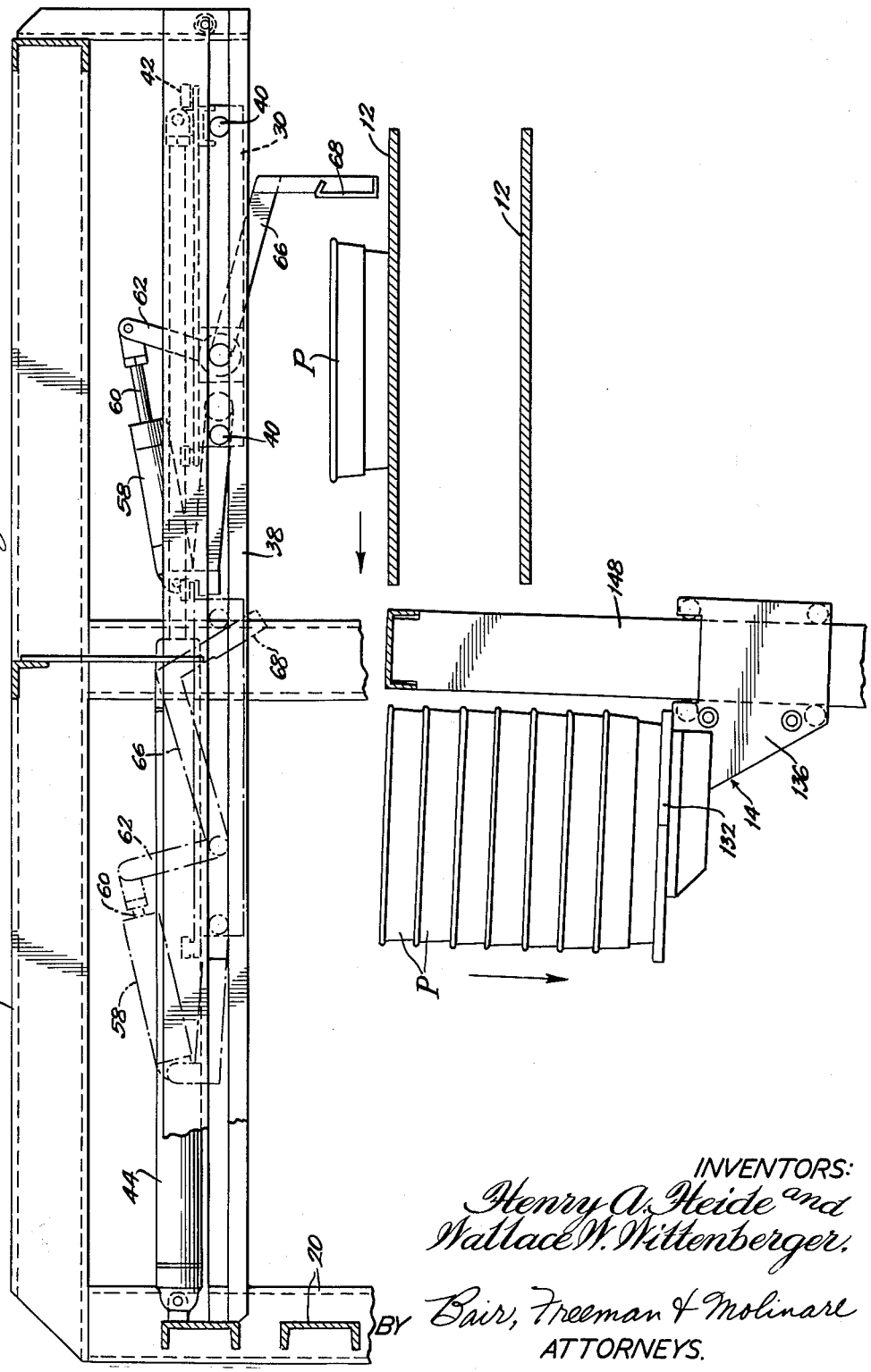

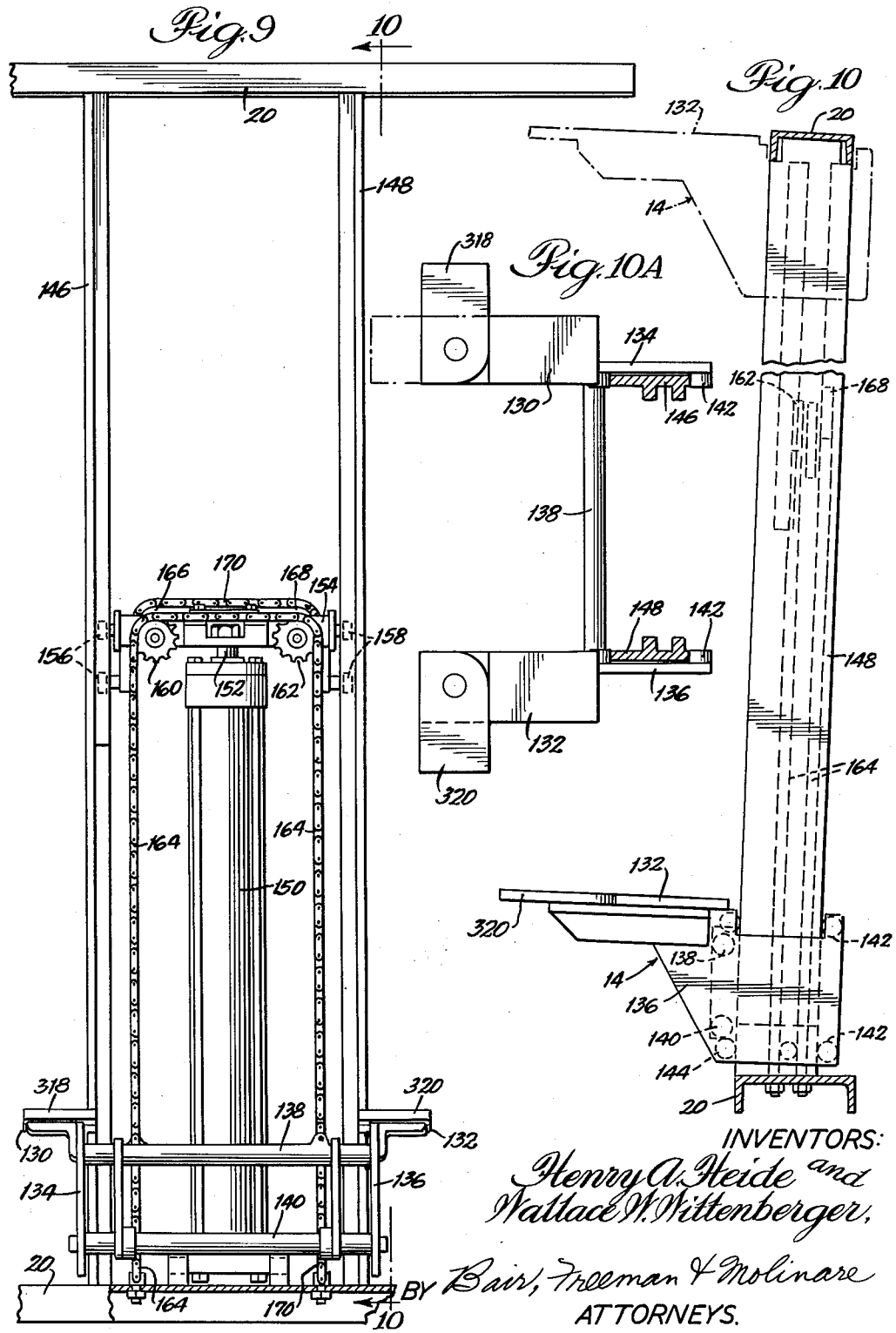

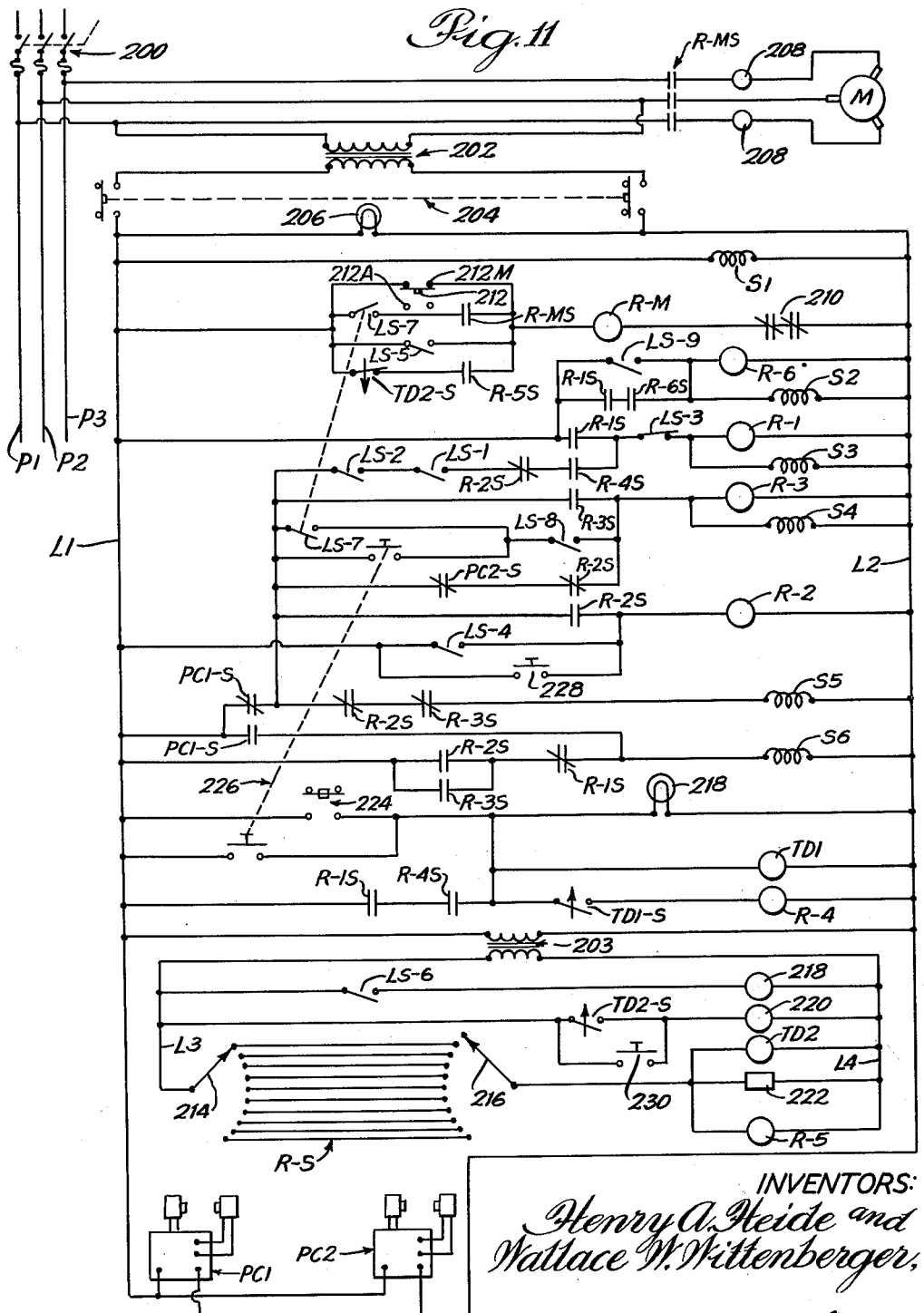

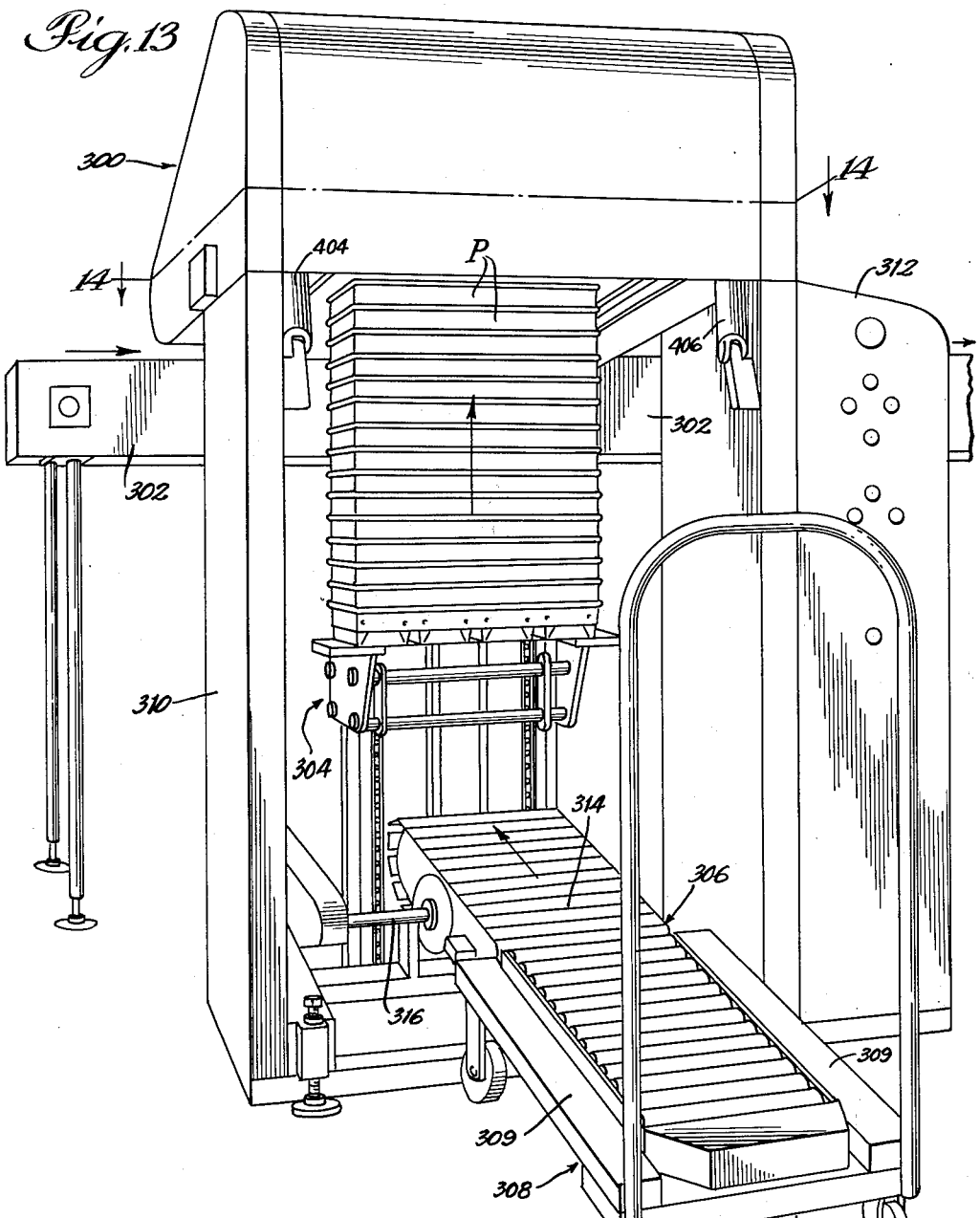

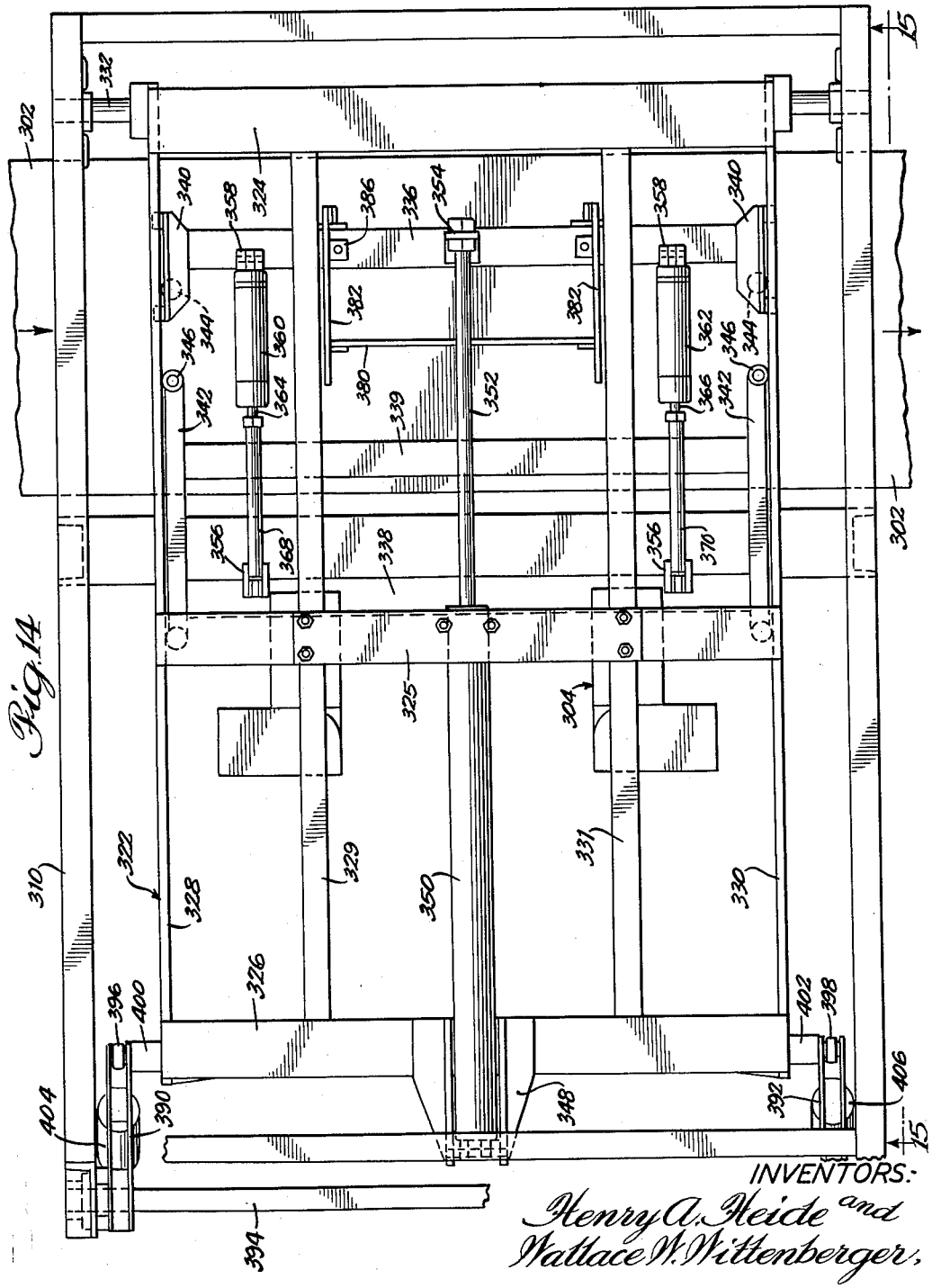

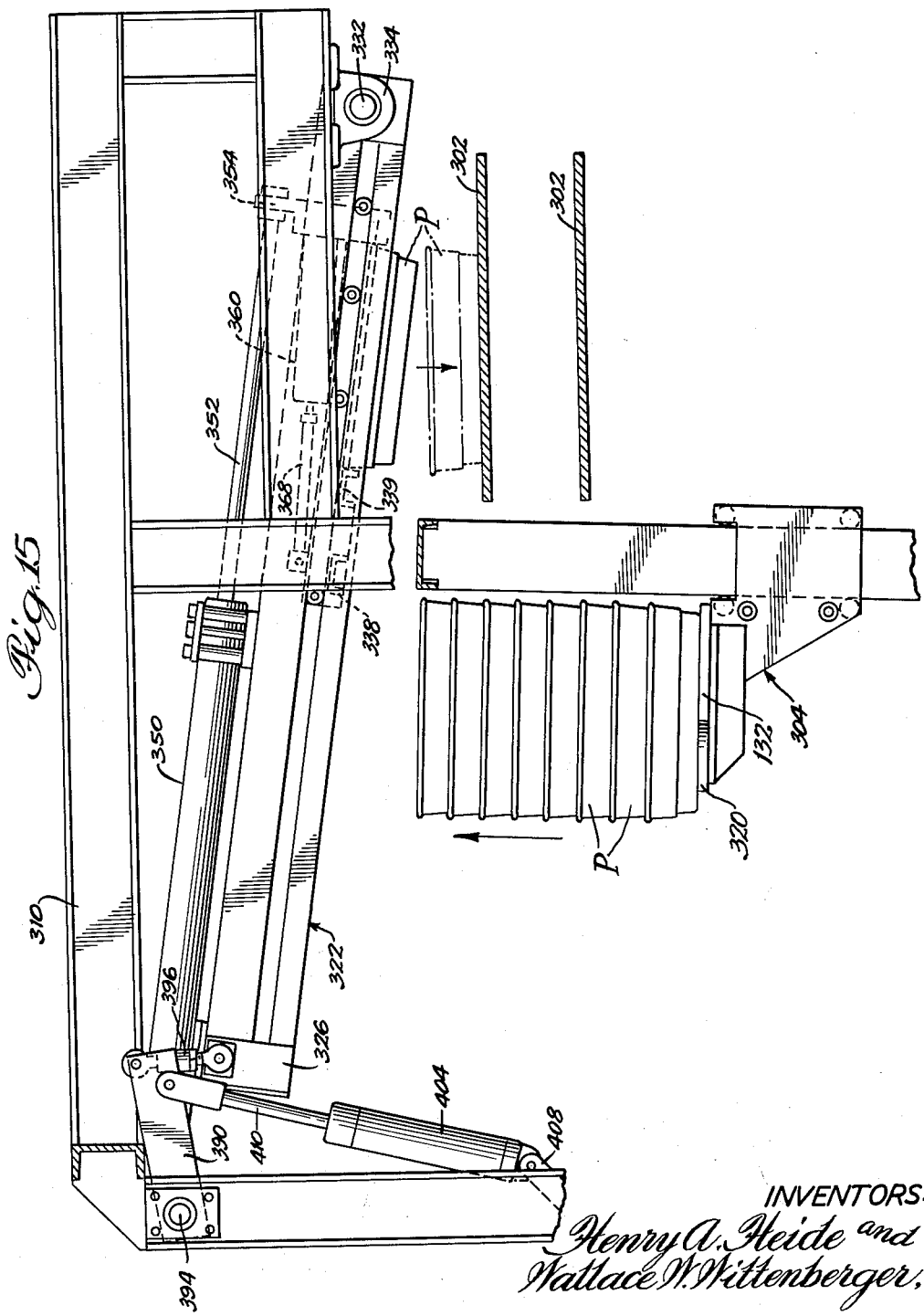

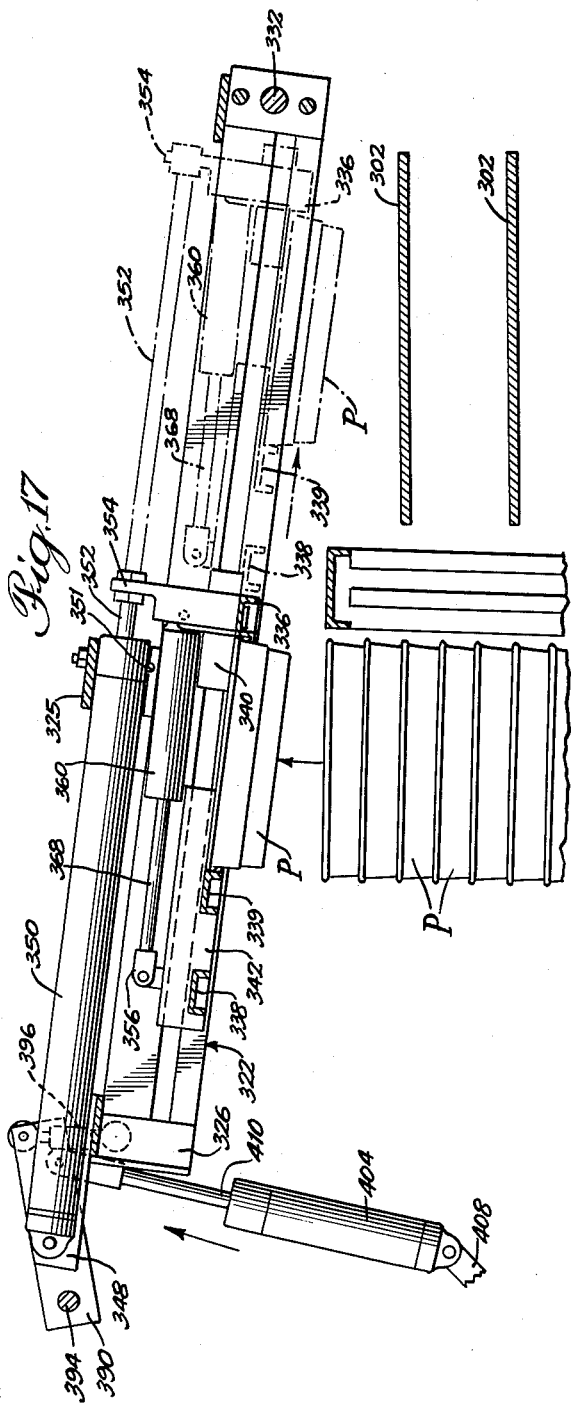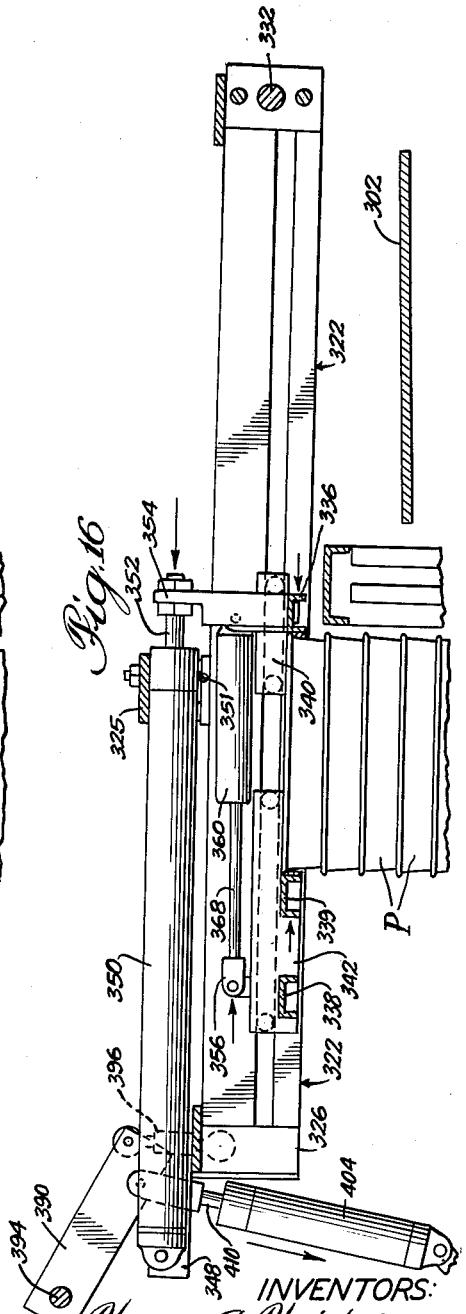

Aug. 27, 1963   H. A. HEIDE ETAL   3,101,851
PAN STACKING AND UNSTACKING SYSTEM
Filed April 22, 1958   16 Sheets-Sheet 14
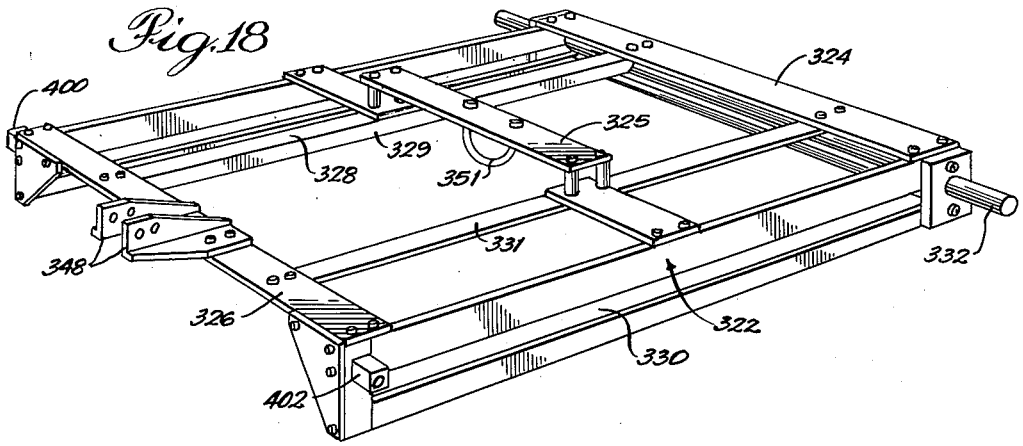
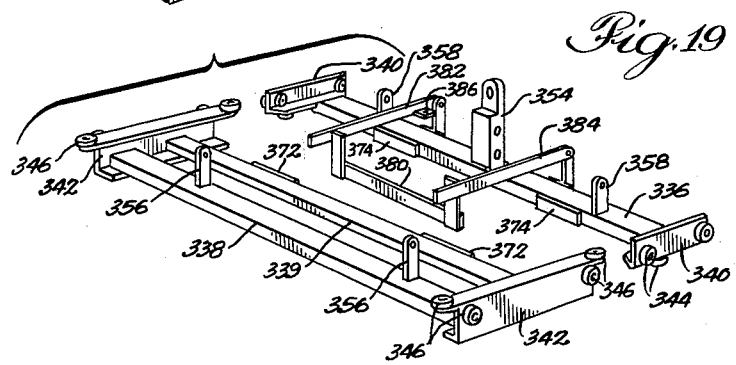
INVENTORS:
Henry A. Heide and
Wallace W. Wittenberger,
BY Bair, Freeman & Molinare
ATTORNEYS.

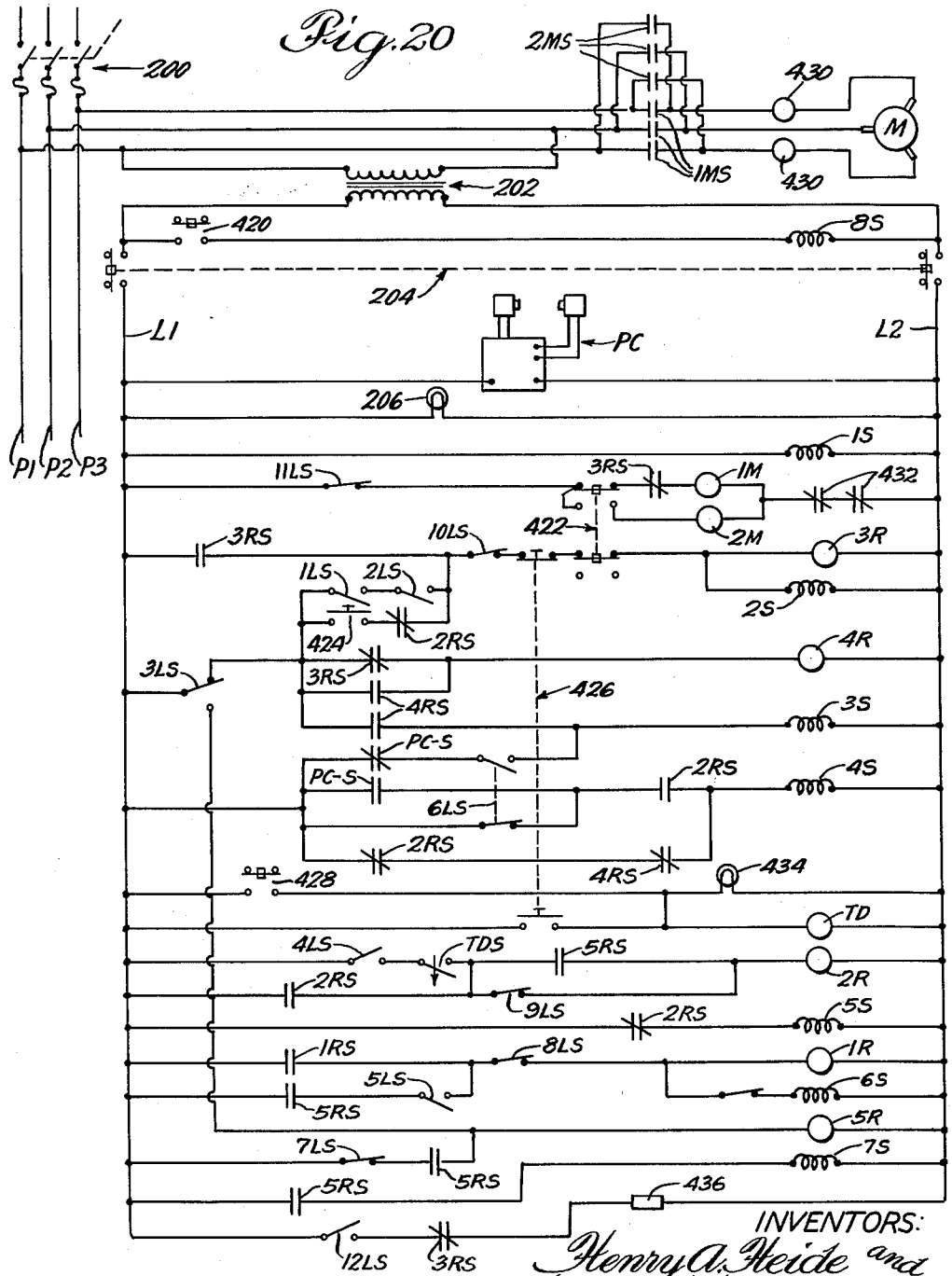

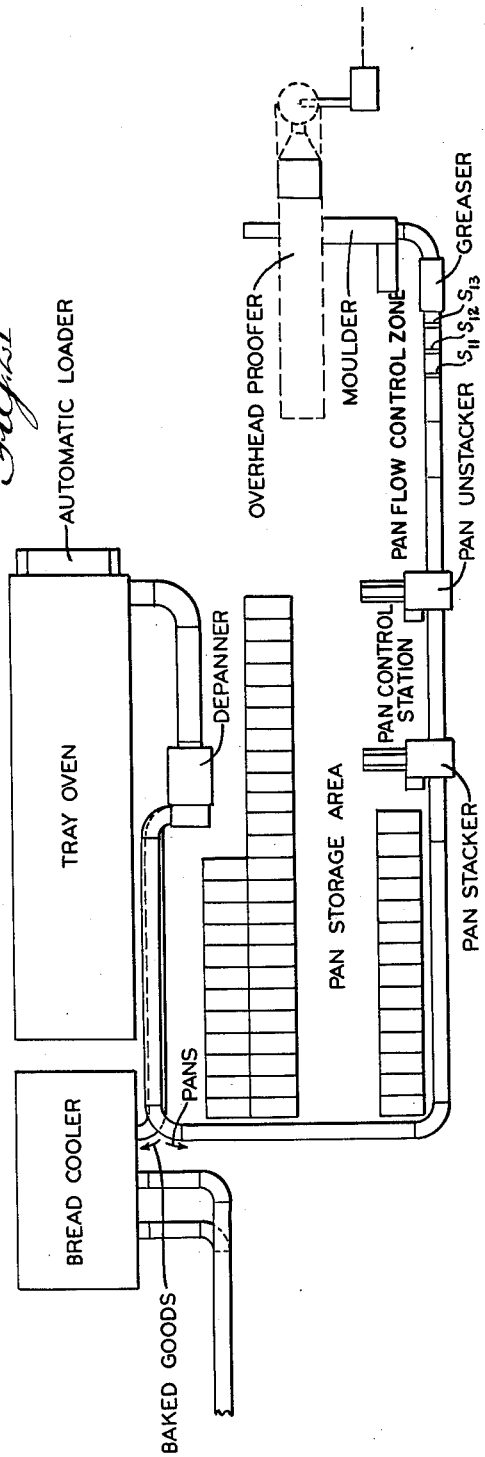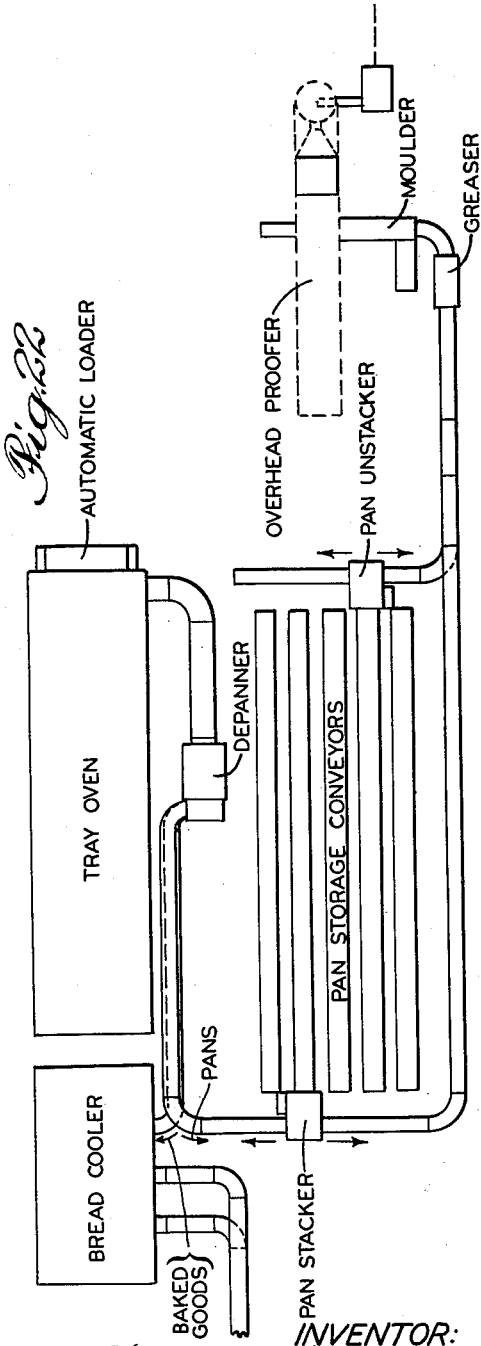

United States Patent Office 3,101,851
Patented Aug. 27, 1963

3,101,851
PAN STACKING AND UNSTACKING SYSTEM
Henry A. Heide, Addison, and Wallace W. Wittenberger, Chicago, Ill., assignors, by mesne assignments, to Baker Perkins, Inc., Saginaw, Mich., a corporation of New York
Filed Apr. 22, 1958, Ser. No. 730,177
8 Claims. (Cl. 214—6)

This invention relates generally to a pan conveying system, and more particularly to novel and improved automatic equipment for effecting continuous stacking of pans at a first operating station and continuous unstacking of pans at a second operating station.

In large commercial bakery installations, the handling of pans used in the baking operation represents an important and large scale problem. In the past, baked goods have been conveyed in pans from a continuously moving oven through automatic de-panning equipment, wherein the baked goods are separated from the pans, and the hot, empty pans are then available for conveyance to a moulder or dough-depositing apparatus preparatory to another baking operation. The conveying operation between the de-panning equipment and the dough-depositing equipment is a process-conveying operation since the highly important function of pan cooling is performed during the time of pan travel. Both natural and forced air convection have been commonly employed to effect pan cooling, and the travel time between the de-panner and the moulder has generally varied from about two to seven minutes, depending upon the type of cooling system employed and the desired pan temperature at the moulder.

Since most commercial bakeries manufacture several varieties of bakery products each day, a section of the pan return conveyor just ahead of the moulder is normally disposed at a working height of about 30 to 36 inches above the floor to allow manual removal of the pans that have just completed the previous baking cycle and to permit manual feeding of pans of a different size or shape onto the conveyor for introduction into the moulder preparatory to a new baking cycle. This operation point in the conveyor system is normally referred to as the "pan control station." In plants of relatively small production capacity it is possible for a single operator to both remove the first type of pan and place the second type of pan on to the conveyor. As production rates increase, however, it is no longer possible for one man to keep pace with the speed of the conveying operation. Where two or more operators are required to perform the pan handling operations at the control station, the economies of automatic machine operation become controlling.

Even in bakeries limited in their operations to a small number and variety of pans, it nevertheless remains necessary to have an operator stationed at the pan control station. The nature of the baking process is such that the dough raising or proofing operation may lag behind or run ahead of the normal planned or anticipated time. Such variations in the expected conveying and process schedule may also occur during the actual baking process. As a result of such variable time factors, pans discharged from the de-panner equipment to the pan control station may arrive either faster or slower than the demands of the constant dough-depositing rate of the moulder equipment. When this occurs, it is necessary for an operator either to remove excess pans or to add additional pans in order to compensate for the variations in the pan feed rate to the moulder and to avoid costly jam-ups or slow-downs.

It is a primary object of this invention, therefore, to provide a bakery pan conveying system having fully automatic equipment at the pan control station operative to: first, continuously remove all pans from the conveyor as they are carried from the de-panner equipment, and to effect fully automatic stacking of such pans for removal to a storage area; and second, continuously unstack and introduce new pans of a selected type from a storage area onto the conveyor system ahead of the dough depositing equipment.

It is another object of this invention to provide a fully automatic pan stacking machine adapted to be mounted in cooperating overlying relation to a continuously moving main conveyor delivering a consecutive series of pans, wherein a stop sensing gate effects stopping and detection of a pan to initiate reciprocating movement of a pusher carriage having rake means for laterally shifting the pan onto the platform of an elevator structure operative to move downwardly in increments of one pan height as the pans are consecutively stacked thereon, one above the other, and wherein an out-feed conveyor is operative to carry successive full pan stacks laterally outwardly of the machine for removal to a storage area.

It is a further object of this invention to provide a fully automatic pan unstacking machine adapted to be mounted in cooperating overlying relation to a continuously moving main conveyor for delivering a consecutive series of pans, wherein an in-feed conveyor is operative to introduce successive full pan stacks onto the platform of an elevator structure which is in turn operative to raise the pan stack upwardly in consecutive increments of one pan height to a vertically and laterally reciprocable carriage structure, which is in turn cyclically operative to grippingly engage the successive uppermost pans of the stack and laterally transfer each pan for discharge onto the main conveyor.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 is a perspective view of a pan stacking machine constructed in accordance with the present invention and mounted in operative relation at the pan control station of a bakery conveyor installation.

FIGURE 2 is a horizontal cross sectional view taken substantially as indicated by the line 2—2 at the top of the stacking machine of FIGURE 1, with parts below omitted for purposes of simplified description.

FIGURE 3 is a fragmentary perspective view showing the details of construction of the pan rake mechanism seen in FIGURE 2.

FIGURE 4 is another horizontal cross sectional view taken below the plane of FIGURE 2, substantially as indicated by the line 4—4 of FIGURE 1, with parts below omitted for purposes of simplified description.

FIGURE 5 is a fragmentary vertical cross sectional view, with parts removed and omitted for purposes of simplified description, taken substantially as indicated by the line 5—5 of FIGURE 4.

FIGURE 6 is a detail view of the operating structure for the pan stop sensing gate seen in FIGURE 5.

FIGURE 7 is a vertical cross sectional view taken substantially as indicated by the line 7—7 of FIGURE 5.

FIGURE 8 is a vertical cross sectional view, with parts removed and omitted for purposes of simplified description, complementing the simplified disclosure of FIGURE 5 of the drawing, and showing the operation of the pan rake structure for effecting pan stacking on the elevator platform.

FIGURE 9 is a front elevational view, partly in section, showing the details of construction of the pan stack elevating means of the pan stacking machine of FIGURE 1.

FIGURE 10 is a vertical cross sectional view taken substantially as indicated by the line 10—10 of FIGURE 9.

FIG. 10a is a plan view of the elevator 14.

FIGURE 11 is a schematic diagram of the electrical wiring and switch control system of the pan stacking machine.

Figure 12:
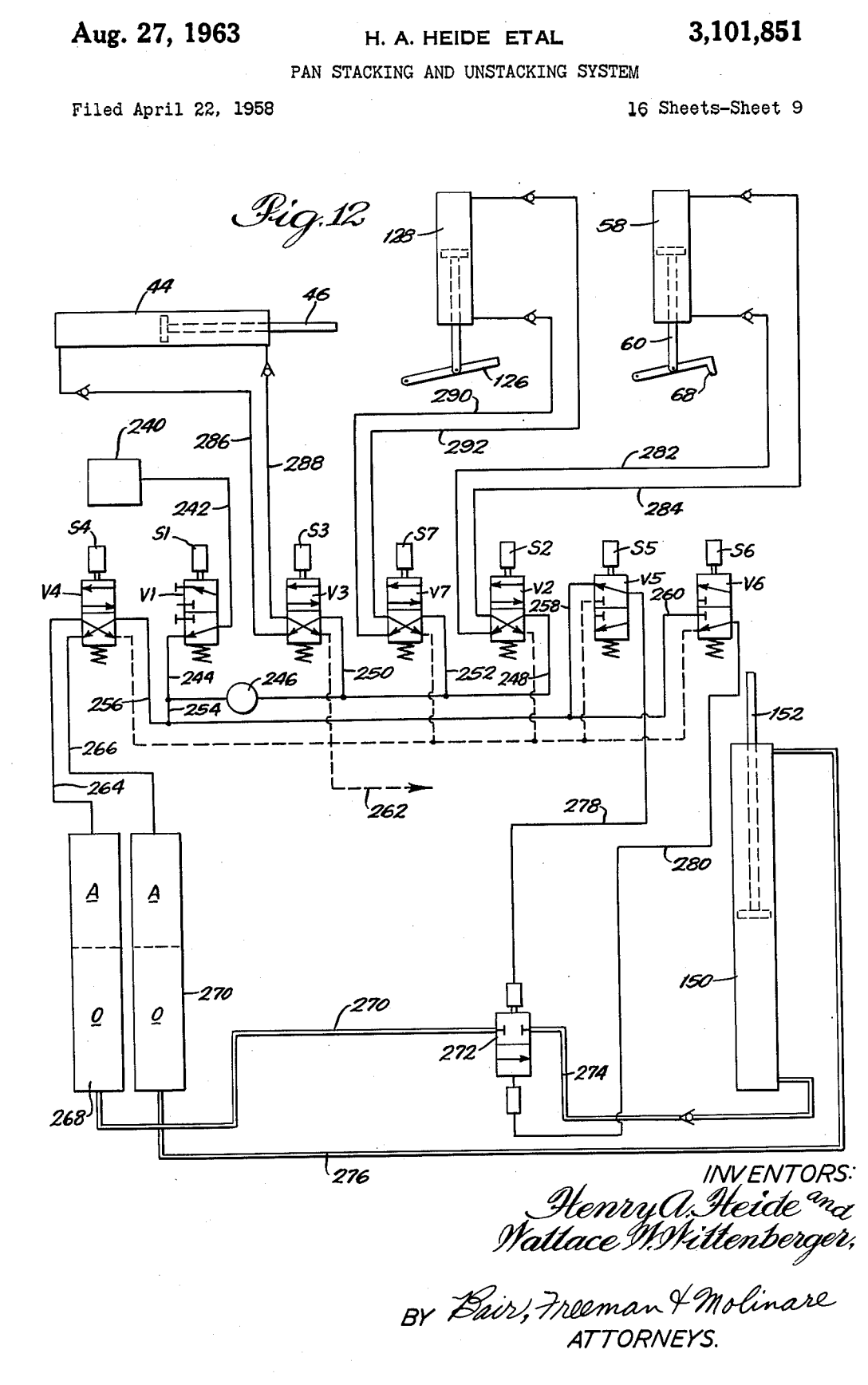

FIGURE 12 is a schematic diagram of the pneumatic and hydraulic control and operating system of the pan stacking machine.

FIGURE 13 is a perspective view of a pan unstacking machine constructed in accordance with the present invention and mounted in operative relation at the pan control station of a bakery conveyor installation and typically at a point forwardly of the pan stacking machine of FIGURES 1 through 12.

FIGURE 14 is a horizontal cross sectional view taken substantially as indicated by the line 14—14 at the top of the unstacking machine of FIGURE 13, with parts below omitted for purposes of simplified description.

FIGURE 15 is a fragmentary vertical cross sectional view, with parts removed and omitted for purposes of simplified description taken substantially as indicated by the line 15—15 of FIGURE 14.

FIGURES 16 and 17 are additional fragmentary cross sectional views, showing the operation of the pan unstacking and delivering structure of FIGURE 15.

FIGURE 18 is a perspective detail view of the pan unstacking carriage frame.

FIGURE 19 is a perspective detail view of the pan gripping and sensing structure.

FIGURE 20 is a schematic diagram of the electrical wiring and switch control system of the pan unstacking machine.

FIGURE 21 is a schematic diagram illustrating a system employing the stacking and unstacking machines.

FIGURE 22 is a similar diagram indicating a modified system in which the machines are employed.

Referring now more particularly to FIGURES 1 through 12 of the drawing, the structure and operations of the pan stacking machine will first be described. The structure and operation of the pan unstacking machine will be later described herein, and the functional cooperation between the two machines in a unitary system for pan conveyance and "control station" operation will then be set forth.

*Pan Stacking Machine*

We have indicated generally at 10 in FIGURE 1 a pan stacking machine constructed in accordance with the principles and features of the present invention. The machine 10 is mounted adjacent and in upper overlying relation to a continuously moving conveyor 12 which the operative to deliver a consecutive series of hot, empty pans from the de-panning equipment at the outlet end of a commercial bakery oven. Elevator means 14 receives and progressively lowers a stack of pans P as they are stacked by the operation of the machine 10. An outfeed conveyor 16 is adapted to receive a full pan stack and effect power-driven removal thereof outwardly of the machine 10 to a vertically reciprocable discharge conveyor 18. The conveyor 18 is adapted to be straddled by hand trucks for collective removal of a series of pan stacks. The main frame and housing structure of the machine has been indicated generally at 20, and the power and control housing portion thereof has been indicated generally at 22.

In accordance with the path of movement of pans through the machine as the stacking operation is performed the structure of the machine will be described from top to bottom. Referring now more particularly to FIGURE 2 of the drawing, the uppermost operating level and the "raking" action whereby pans are laterally transferred from the conveyor 12 onto the elevator 14 will now be described. A pusher carriage 30, having side and end channels 32 and 34 (see also FIGURE 6), is mounted for slidable reciprocation from front to back along the length of the machine frame upon a pair of carriage rails 36 and 38. Pairs of horizontal and vertical axis rollers 40 and 42 effect a rolling mounting of the carriage 30 upon the carriage rails 36 and 38. A pneumatic operating cylinder 44 is secured at its base end to the machine frame 20, and provides an actuator rod 46 having its free end secured by means of a bracket coupling assembly 48 to the carriage end channel 34. In this way, pneumatic actuation of the cylinder 44 serves to effect controlled reciprocation of the carriage 30.

A fixed cross shaft 50 and a rotatable cross shaft 52 extend transversely between the carriage side channels 32. Support arms 54 are fixedly connected at their one end to the cross shaft 50, and are pivotally secured at their other end by means of a coupling 56 to the base end of a pneumatic actuating cylinder 58. The actuating rod 60 of the cylinder 58 has its free end pivotally secured to the ends of lever arms 62, which are in turn fixedly connected at their opposite ends to the rotatable cross shaft 52.

Support arms 64 and 66 extend from the cross shaft 52 in fixed relation thereto, and serve to suspend a pan pusher plate 68.

As best seen in FIGURE 7 of the drawing, the pusher plate 68 is adapted to cooperatively engage a pan as it is delivered to the machine 10 upon the conveyor 12, and effect its lateral movement onto the elevator 14 for effecting formation of a nested stack of consecutively delivered pans. The operation of the pneumatic cylinder 58 is coordinated with the carriage reciprocating action of the pneumatic cylinder 44 so as to maintain the pusher plate 68 in its "down" position for engaging and raking a pan laterally onto the elevator as the carriage 30 is pulled forwardly from a position overlying the conveyor 12 to one overlying the elevator 14. As the carriage is returned for the next raking action, the cylinder 58 is actuated to effect withdrawal of the rod 60 and consequent pivoting of the pusher plate 68 about the axis of the cross shaft 52, so as to elevate it to a level of clearance with the next successive pan on the conveyor 12 during the return movement of the carriage 30. The raking position of the pusher plate 68 is indicated in solid line in FIGURE 8, preparatory to engagement with a pan and lateral delivery over the elevator, and the retracted or clearance position of the pusher plate 68 is indicated in dot-dash outline.

A secondary operating level, immediately below the carriage and rake actuating structure shown in FIGURE 2, provides pan sensing and guiding means in the plane of lateral traverse of the pans from the conveyor 12 to the elevator 14. This pan sensing and guiding structure is shown in detail in FIGURES 4 to 7 of the drawing.

Referring now more particularly to FIGURES 4 and 5, a pair of adjustable guide and pan stop support members 70 and 72 are provided in spaced parallel relation, extending from front-to-back at the general level of the plane of pan raking. The forward ends of the supports 70 and 72 are secured to vertically elongated pan bumper members 74, and the rear ends thereof are secured to support blocks 76. The respective pairs of pan bumpers 74 and support blocks 76 are threadedly received upon a pair of transverse adjusting rods 78 and 80. A back stop member 77 provides a forward limit for the bumpers 74. The rods 78 and 80 are oppositely threaded at their ends for reverse actuating cooperation with the bumper and block members of the respective supports 70 and 72.

The opposite ends of the rods 78 and 80 are mounted upon the frame 20 in bearing blocks 82 and 84 for free rotation. The blocks 82 and 84 are internally threaded so as to be adjustably carried upon corresponding longitudinal adjusting rods 86 and 88 at the sides of the machine. The free ends of the rods 86 and 88 are rotatably secured to the machine frame 20 by means of suitable bearing supports 90 and 92. An inter-connecting chain and sprocket assembly 94 couples together the rotational movement of the transverse adjustment rods 78 and 80. A chain and sprocket assembly 90 and 96 couples the transverse adjusting rod 80 to the shaft of an external hand wheel 98. In this way, manual rotation of the wheel 98 will serve to effect rotation of the longitudinal adjusting rods 86 and 88, thereby causing simultaneous adjusting movement of the transverse rods 78 and 80 and the back stop member 77 as a unit longitudinally from front to back. Such adjusting movement effects selective positioning of the guide and pan stop supports 70 and 72 in accordance with the particular length of pans being stacked.

A second adjusting hand wheel 100 provides a shaft which is coupled through a chain and sprocket assembly 102 to a square or splined hollow shaft 104. An inner slide rod 106 extends telescopically from the shaft 104 and carries a small helical gear 108 at its free end which is adapted to mesh with a large helical gear 108 fixedly carried by the transverse adjusting rod 78. A chain and sprocket assembly 110 couples together the transverse adjusting rods 78 and 80. In this way, manual rotation of the hand wheel 100 effects rotation of the transverse adjusting rod 78, and the coupled rod 80, enabling the oppositely threaded ends of the rods to effect directionally opposite adjusting movements of the guide and pan stop supports 70 and 72. Selected directional rotation of the hand wheel 100 serves to move the supports 70 and 72 toward or away from each other for accommodating pans of various widths. Pan guide plates 112 and 114 are supported from the adjustably positionable members 70 and 72, and may be of any suitable form, such as the rearwardly diverging shape seen in FIGURE 4, for facilitating proper alignment and orientation of the pans as they are raked forwardly onto the elevator. The hollow shaft 104 and its rod 106 serve to maintain geared interconnection of the transverse adjusting rod 78 with its hand wheel 100 during longitudinal adjustments of the rods 78 and 80 by the hand wheel 98 and the longitudinal adjusting rods 86 and 88.

In order to detect the presence of a pan on the conveyor 12 and initiate the raking cycle for lateral delivery of the pan to the elevator, a stop sensing gate assembly, indicated generally at 116 in FIGURES 5 to 7, is provided. The assembly 116 is rotatably suspended from a horizontal pivot shaft 118 carried by either of the supports 70 or 72, in accordance with the particular direction of pan feed by the conveyor 12. In FIGURE 4 the pans are indicated in dot-dash outline at P as being delivered to the machine from its left hand side, in accordance with FIGURE 1. The stop sensing assembly 116, therefore, is suspended from the support 72 at the side of the machine remote from the side of pan entry. The assembly 116 comprises pivoted and normally spaced backing and contact plates 120 and 122. The backing plate 120 serves to mount a microswitch LS-1 having a spring biased plunger member which engages the contact plate 122 and maintains it in normally spaced relation to the backing plate 120 (see FIGURE 7). A "wobble" linkage 124 interconnects the assembly 116 through a pivot plate 126 to the actuator rod of a pneumatic cylinder 128. Actuation of the cylinder 128 to withdraw its actuator rod and upwardly pivot the plate 126 will serve to effect an upward arcuate movement of the stop sensing gate assembly 116, and thereby permit pans carried by the conveyor 12 to move freely without obstruction through the machine 10. In this way, pans may be passed directly to another process operation independently of the pan stacking machine 10 when desired, thereby eliminating the necessity for any shifting of the machine 10 or the conveyor 12 out of their normal cooperative and adjacent positions.

The substantial height of the machine 10 below the operating levels thus far described is occupied by the elevator means 14 and may be termed the elevator operating zone. The height of travel of the elevator, and the over-all design height of the machine 10, is selected so as to accommodate pan stacks of substantial number and height, usually about 25 pans to the stack. As each pan is delivered to the elevator by the raking mechanism, the elevator is jogged downwardly an increment of one pan height. This intermittent elevator lowering is continued with each pan as delivered until a full stack of predetermined height has been formed.

Referring now more particularly to FIGURES 9 and 10 of the drawing, the structure of the elevator 14 will be described. An elevator platform upon which the pans are received and stacked is defined by a pair of laterally spaced lift support members 130 and 132. The supports 130 and 132 are secured to corresponding side plate assemblies 134 and 136, which are coupled together in fixed spaced relation by means of a spacer pipe 138 and a tie rod 140. Sets of glide rollers 142 and 144 effect external cooperating engagement between the side plate assemblies 134 and 136 and vertical glide rails 146 and 148, respectively, extending the full height of the elevator operating zone and fixedly secured to the frame 20 at their top and bottom. A hydraulic operating cylinder 150 is fixedly secured at its base to the machine frame 20 in vertically upwardly extending relation, and provides an actuator rod 152 secured at its free end to a carriage assembly 154. Glide rollers 156 and 158 are provided at the side ends of the carriage 154 and effect internal engagement with the glide rails 146 and 148.

A first pair of sprockets 160 and 162 are carried at the forward side of the carriage 154. A lift chain 164 passes over the sprockets 160 and 162. The left hand end (as seen in FIGURE 9) of the chain 164 is fixedly secured to the bottom of the machine frame 20, and the opposite or right hand end is secured to the right hand side of the spacer pipe 138. A second pair of sprockets 166 and 168 are carried by the carriage 154 at its rear side. A second lift chain 170 engages the sprockets 166 and 168. The left hand end of the chain 170 is secured to the left hand side of the spacer pipe 138, and the right hand end thereof is secured to the bottom of the machine frame 20. In this way, the lift chains 168 and 170 accomplish a force balancing function for equally distributing the weight of a pan load between the lift supports 130 and 132. In this way, a balanced weight load on the elevator, and consequently on the operator cylinder rod 152, is achieved even when the pans are not evenly located upon the elevator platform.

The lowermost operating level of the machine effects pan stack discharge, and comprises the intermittently driven out-feed conveyor 16 and the free discharge conveyor 18. The conveyor 16 provides a traveling level of about two to three pan lengths so as to extend just outwardly of the machine 10. The traveling level is defined by a plurality of slats 180 of sufficient length to support a pan stack, but shorter than the distance between the elevator lift supports 130 and 132, so that the latter will straddle the receiving end of the conveyor 16 and freely deposit a pan stack thereon as the elevator is lowered below the level of the conveyor. The slats 180 are power driven through a single running cycle as each full pan stack is deposited thereon by the elevator 14, thereby effecting discharge of each such pan stack out of the machine 10 and onto the discharge conveyor 18. The traveling level of the conveyor 18 is defined by a plurality of free rollers 184, and is supported upon vertically adjustable support members 186. The rollers 184 are normally aligned at the same level as the slats 180, so that a pan stack will be discharged thereon from the driven conveyor 16. The rollers 184 of the conveyor 18 may then be lowered for delivery of a plurality of pan stacks onto the spaced rails or forks of a hand truck or the like which is adapted to straddle the conveyor 18. It will be understood, of course, that the discharge conveyor 18 may be replaced by any suitable automatic conveyor system, in accordance with the particular demands of each installation. Such further automatic pan stack handling will be discussed hereinafter in connection with the overall system operation of both the pan stacking and pan unstacking machines of the present invention.

Referring now more particularly to FIGURE 11 of the drawing, the electrical circuitry for the pan stacking machine 10 will be described. Power supply lines P1, P2 and P3, having a main disconnect switch and associated line fuses 200, provide current to a three phase motor M for power drive of the out-feed conveyor 16. A transformer 202 transmits power from lines P1 and P2 at a rating of 220 volts to main circuit lines L1 and L2. An additional transformer 203, connected across the lines L1 and L2, provides a reduced 110 volt current supply to supplemental circuit lines L3 and L4. A master "on-off" switch 204 is indicated with double sets of contacts in their "off" position. A master pilot light 206 serves to indicate energization of the main circuit lines.

A plurality of cross lines extending across the main circuit lines L1 and L2 interconnect the various electrical components of the machine circuitry for effecting a predetermined and automatic regulation of the operation of the stacking machine as heretofore described in connection with its mechanical structure. The various components will be briefly described in groups in connection with FIGURE 11 of the drawing, and their particular control functions and inter-relation will be made more clearly apparent from a description of the practical operation of the machine 10, to be hereinafter set forth.

A plurality of relays are provided for circuit actuation of corresponding relay-controlled contacts or switches. Relay R—M controls switches R—MS for regulating the actuation of the out-feed conveyor motor M. Cooperating relays 208 regulate suitable overload switches 210 to safeguard the operation of the motor M in the event of an excessive weight load upon the out-feed conveyor 16. Additional relays R–1, R–2, R–3, R–4, R–5 and R–6 similarly effect the regulation of corresponding switch contacts, both normally open and normally closed, designated respectively as R–1S, R–2S, R–3S, R–4S, R–5S and R–6S.

Various manual switches are provided for operator control of the machine as may be desired independently of its normal automatic function. A manual-automatic selector switch 212 for over-riding the automatic cyclical operation of the motor M as normally regulated by the relay R—M. The switch contacts for manual operation are indicated at 212M, and the contacts for automatic operation at 212A.

A plurality of limit switches, mounted at various mechanical operating areas of the machine for actuation in accordance with the performance of specific machine functions, are indicated in FIGURE 11 at LS–1 through LS–8. Switch LS–1 is the pan stop gate sensing switch, engaged as a pan upon the conveyor 12 is carried into abutting contact with the pan stop gate assembly 116. Switch LS–2 is the pan pusher start switch, engaged by the pusher carriage 30 when it is at its "ready" or waiting position over the conveyor 12 preparatory to the raking of a pan laterally toward the elevator lift platform. Switch LS–3 is the pan pusher stop switch, engaged by the carriage 30 when it is at its full forward position after the raking of a pan onto the elevator lift platform, and serves to initiate return travel of the pusher carriage 30 to its "ready" position. Switch LS–4 is the stack-filled switch, engaged by the elevator lift platform after it has been lowered in pan-height increments to the predetermined lower level of a full pan stack, and serves to lower the platform still further to its stack discharge position onto the out-feed conveyor 16. Switch LS–5 is the out-feed conveyor starting switch, engaged by the elevator lift platform just prior to reaching its bottommost position as controlled switch LS–4, and serves to actuate the out-feed conveyor drive motor M. Switch LS–6 is correlated with switch LS–5, the two switches comprising a double block unit, and operates to pulse a stepping relay R—S, which controls the downward increment movements of the elevator lift platform, preparatory to a new cycle of operations. Switch LS–7 is the elevator lift platform clearance switch, and is mounted for cooperative engagement with a cam carried by the out-feed conveyor drive shaft 182 for stopping the out-feed conveyor and initiating raising of the elevator after one full revolution of the conveyor shaft. Switch LS–8 is the bottoming switch, mounted slightly below the switch LS–5 and LS–6 so that switch LS–5 will be engaged before switch LS–8 is engaged by the elevator lift platform in its down position. Switch LS–9 is the pan pusher plate lowering switch, mounted closely adjacent the switch LS–2 for engagement by the pusher carriage when in its "ready" position, and serves to effect lowering of the plate 68 to its raking position.

Photoelectric cell switch units PC1 and PC2, each having a light source and a receiver element, are mounted at opposite sides of the machine at a level corresponding to the uppermost position of the elevator platform. Unit PC1 constitutes the elevator lift platform leveling switch, and serves to adjust the stack to a position flush with the pan loading plane. Unit PC2 is the elevator lift platform low level booster switch and is positioned slightly below unit PC1 for re-raising the elevating platform to its top pan receiving position in the event of slight lowering of the elevating platform because of valve inaccuracies or leakage during prolonged periods of machine idling.

A plurality of solenoids are provided for actuating and controlling the pneumatic and hydraulic components of the machine. The various solenoids are indicated at S1 through S6. Solenoid S1 regulates the main air supply. Solenoid S2 controls the operation of the pan pusher plate actuating cylinder 58. Solenoid S3 controls the operation of the pan pusher carriage actuating cylinder 44. Solenoids S4, S5 and S6 control the operation of the elevator lift platform actuating cylinder 150.

The stepping relay R—S is operative in accordance with its predetermined manual setting for response to the full stepwise lowering of the elevating platform as successive pan stacks are delivered to the out-feed conveyor 16. In practice, a stack height of about 25 pans is selected. A tap switch wiper 214 may be manually positioned in accordance with the desired number of full pan stacks, and will serve to complete contact with a stepping wiper 216 as it is moved in accordance with the operation of a stepping coil 218 and a reset coil 220. An alarm bell 222 serves to indicate the delivery of the selected number of pan stacks.

A load "on-off" switch 224, a load "jog" switch 226, and a release switch 228 are provided for manual operation. Two time delay devices TD–1 and TD–2 are provided in the circuit, and serve to mechanically operate corresponding delay switches TD1–S and TD2–S.

In FIGURE 12 of the drawing we have schematically illustrated the combination penumatic-oil system which provides power for the various mechanical operations of the pan stacking machine 10. Air flow lines have been indicated in single line on the diagram, and oil flow lines have been indicated in double line, to faciliate distinction between the two fluid flow portions of the circuit. A main supply of air under suitable operating pressure is indicated at 240. This main air supply communicates through a supply line 242 with a control valve V1 which is regulated by the main air control solenoid S1. The air supply is delivered from the valve V1 by a line 244 through a pressure regulator 246 and lines 248 and 250 to valves V2 and V3, which are controlled by the pan pusher plate solenoid S2 and the pan pusher carriage solenoid S3, respectively. This same air supply, downstream of the regulator 242, is also delivered by a line 252 to a valve V7 regulated by a solenoid S7, not shown in the circuit diagram of FIGURE 11. The solenoid S7 is manually actuated independently of the normal automatic control operations of the machine 10, when it is desired to elevate the stop sensing gate assembly 116 out of its operative position to enable pans on the conveyor 12 to by-pass the operation of the stacking machine 10. A branch supply line 254 upstream of the regulator 246 provides a direct air supply by lines 256, 258 and 260 to valves V4, V5 and V6, controlled by the solenoids S4, S5 and S6, respectively. Each of the valves V2, V3, V4, V5, V6 and V7 communicate with an exhaust 262 through suitable exhaust lines indicated by dotted lines on FIGURE 12.

The valve V4 communicates through lines 264 and 266 with the upper air chamber A of a pair of pneumatic-hydraulic balancing cylinders 268 and 270, respectively. The lower oil chamber O of cylinder 268 communicates through a line 270 with a regulating device 272, which in turn communicates through an oil line 274 with the lower chamber of the hydraulic elevator lift platform operating cylinder 150. The lower oil chamber O of cylinder 270 communicates directly through a line 276 with the upper chamber of the hydraulic cylinder 150. The regulating device 272 receives balancing pneumatic signals from the valves V5 and V6 through lines 278 and 280, respectively.

The valve V2 communicates through pneumatic supply lines 282 and 284 with the opposite ends of the pneumatic actuating cylinder 58 for controlling the operation of the pan pusher plate 68. Valve V3 similarly communicates through supply lines 286 and 288 with the opposite ends of the pneumatic operating cylinder 44 of the pusher carriage assembly. The valve V7 communicates through lines 290 and 292 with the pneumatic cylinder 128 for withdrawal operation of the stop sensing gate assembly 116.

In this way, a unitary and closed pneumatic hydraulic system is provided for pneumatic operation of the machine functions performed by the cylinders 44, 58 and 128, and for hydraulic operation of the elevator cylinder 150.

The practical operation of the pan stacking machine 10 will now be briefly summarized. A supply of pans P will be carired by the conveyor 12 to the uppermost operating level of the machine 10. The elevator lift platform will be in its uppermost position and in proper alignment at the pan transfer level for receiving the first of the stack of pans to be formed thereon. The pan pusher carriage 30 will be in its "ready" or back position overlying the pan feed conveyor 12, and will effect engagement with the pan pusher starting switch LS-2. Each pan will engage and be stopped by the stop sensing gate assembly 116, effecting closing of the pan sensing switch LS-1. The raking action of the pan pusher plate will then be performed as the carriage 30 is drawn frowardly to a position overlying the elevator lift platform. The presence of a pan on the elevator platform will effect an interruption of the light beam of the photoelectric cell unit PC1. The pusher carriage 30 will engage the pan pusher stopping and return switch LS-3 in its forward position, and its return movement will be initiated. The elevator lift platform will then drop to its next or lower pan level position. This sequence of operations will be continuously repeated until a full stack of pans has been formed on the elevator lift platform.

The elevator lift platform, in its full pan stack or "down" position, will engage the stack filled switch LS-4, discontinuing its stepping action and effecting full lowering to its bottommost position. Such full lowering results in engagement of the double block microswitches LS-5 (out-feed conveyor starting) and LS-6 (stepping relay pulsing), and bottoming switch LS-8. The stepping relay will be pulsed to its starting position for the next stack-forming operation, and the out-feed conveyor will be actuated through a single discharge cycle. A complete rotation of the out-feed conveyor drive shaft will effect engagement with the elevator lift platform clearance switch LS-7 to discontinue the drive of the out-feed conveyor and permit the elevator lift platform to return to its pan receiving or "top" position. It will be apparent that pan stacks of various total heights may be readily accommodated by adjusting the fixed position of the stack filled switch LS-4. The positions of the various other limit switches need not be adjusted for normal operating requirements.

The machine will continue to perform this same cycle of operations, continuously forming stacks of pans, as long as pans are supplied to the machine or until any of its operations are manually interrupted or over-ridden by a machine operator. The pan stacking machine 10, therefore, is fully automatic in its operation.

*Pan Unstacking Machine*

Referring now more particularly to FIGURES 13 through 20 of the drawing, the structure and operation of the pan unstacking machine will next be described. We have indicated generally at 300 in FIGURE 13 a pan unstacking machine constructed in accordance with the principles and features of the present invention. The machine 300 is mounted adjacent and in upper overlying relation to a continuously moving conveyor 302 which is operative to deliver a consecutive series of pans, as unstacked by the machine 300, to the dough depositing or other operating equipment of a commercial bakery installation. In practice, the unstacking machine 300 will be located substantially immedaitely forwardly of the stacking machine 10 in the flow cycle of a sequence of baking operations, and at the pan "control station" thereof.

Elevator means 304 receives and progressively elevates a stack of pans P as they are successively unstacked and deposited upon the conveyor 302 by the operation of the machine 300. An in-feed conveyor 306 is adapted to receive a plurality of full pan stacks and effect power driven movement thereof inwardly of the machine 300 for delivery onto the lift platform of the elevator means 304. A hand truck 308, having side rails 309 for supporting pan stacks thereon, is adapted to straddle the conveyor 306 for delivery of pan stacks thereto. The main frame and housing structure of the machine has been indicated generally at 310 and the power and control housing portion thereof has been indicated generally at 312.

In accordance with the path of movement of pans through the machine as the unstacking operation is performed, the structure of the machine will be described from bottom to top. The lower operating levels of the machine perform the in-feed conveying and stack elevating operations. As best seen in FIGURE 13, the in-feed conveyor 306 provides a traveling level defined by a plurality of power driven slats 314. The outermost end of the conveyor 306 is mouned upon suitable vertically adjustable support members (not shown), and the innermost end thereof is freely pivoted about a horizontal shaft 316. When the outermost end of the conveyor 306 is in a lowered position, the support rails 309 of a hand truck 308 will permit a straddled positioning of pan stacks in overlying relation above the slats 314 and slightly spaced therefrom. Manual actuation of the vertically reciprocable support means at the outermost end of the conveyor 306 will serve to effect a pivoting of the entire conveyor structure about the shaft 316, thus raising the traveling level of the slats 314 above the plane of the hand truck rails 309. In this way, the pan stacks are delivered freely onto the conveyor traveling level and are power driven thereby into the machine for delivery onto the lifting platform of the elevator 304.

The structure of the elevator 304 is substantially identical with the elevator 14 shown in FIGURES 9 and 10 of the drawing, and described in detail in connection with the structure of the pan stacking machine 10. In practice, the lift support members for the pan unstacking machine are preferably substantially shorter in length than the width of the pans supported thereon. In the case of the pan stacking machine 10, the lift support members 130 and 132 are of substantially greater length than the width of the pans thereon, as will be apparent from a comparison of FIGURES 8 and 15 of the drawing. In order to provide interchangeable parts for both machines, the same lift support members may be employed in both structures by utilizing pivoted end portions 318 and 320, which may be rotated at right angles to the longitudinal extent of the base portions of the lift supports 130 and 132 so as to reduce the over-all effective length of the elevator supporting platform. The shortening pivoted position of this structural arrangement has been indicated in FIGURE 10A of the drawing, and the full length position in FIGURE 10. The shortening of the effective length of the elevator lift supports when employed in the pan unstacking structure avoids the risk of having a forward pan stack delivered onto the elevator with an immediately adjacent and abutting pan stack also partially disposed upon the elevator lift supports. In this way, possible jamming and obstruction between adjacent pan stacks will be avoided at the point of delivery onto the elevator structure.

As the elevator 14 elevates the pan stack upwardly in increments of one pan height, the operating structure at the top of the machine, constituting the pan unstacking level, successively engages the uppermost pan of the stack and effects its elevation and lateral delivery and release onto the conveyor 302, thus performing the unstacking function.

Referring now more particularly to FIGURES 14 and 15 of the drawing, the machine structure for performing the actual pan unstacking will be described. A carriage frame 322 is disposed at the uppermost end of the machine and comprises front and rear end members 324 and 326, a transverse tie member 325, side rails 328 and 330, and longitudinal tie members 329 and 331 (see also FIGURE 18). The front end member 324 is secured to a pivot shaft 332 having is free ends mounted in bearing blocks 334 at opposite sides of the machine frame 310. A front carriage assembly 336 and a rear carriage assembly 338, 339 are reciprocably supported upon the frame 332. The front carriage 336 provides a pair of side members 340, and the rear carriage similarly provides a pair of side members 342 (see also FIGURE 19). The respective pairs of side members have horizontal and vertical axis sets of rollers 344 and 346, respectively, which are rollingly mounted upon the side rails 328 and 330 of the carriage frame 322. In this way, the front and rear carriage assemblies are longitudinally reciprocable along the length of the carriage frame.

The rear end member 326 of the carriage frame 322 provides a pair of pivot brackets 348 which serve to mount the base end of a pneumatic operating cylinder 350. A support ring 351 of the tie member 325 provides supplemental support for the cylinder 350. An actuating rod 352 of the cylinder 350 has its free end secured to the front carriage 336 by means of a connector bracket 354. A set of pivot brackets 356 is secured to the portion 338 of the rear carriage assembly, and a cooperating set 358 is secured to the front carriage assembly 336. A pair of pneumatic operating cylinders 360 and 362, having actuator rods 364 and 366, and adjustable extensions 368 and 370, effect a mechanical interconnection of the front and rear carriages. The facing edges of the carriage portion 339 and carriage 336 constitute pan-gripping jaws and are provided with pairs of bumpers 372 and 374. It will be apparent that selective actuation of the cylinders 360 and 362 will serve to move the front and rear carriages toward and away from each other for alternately gripping and releasing pans therebetween. The rear carriage portions 338 and 339 are normally fixed relative to each other, although slots are provided in the side members 342 for selective adjustment of the portion 339 toward and away from the portion 338 to accommodate machine operation with pans of various widths by varying the operating distance between the jaw-gripping means provided by members 339 and 336.

A pan detector and ejector bar 380 extends downwardly over the area immediately between the jaws provided by members 339 and 336 for cooperative engagement with a pan when gripped therebetween. The bar 380 is supported by a pair of arms 382 and 384, which are in turn pivotally supported by the front carriage 336. Mounting ears 386 and 388 provide means for securing spring elements to bias the bar 380 downwardly toward the pan gripping zone. As a pan is engaged between the front and rear carriages, it will effect contact with an elevation of the bar 380.

Pairs of pivot arm members 390 and 392 are mounted at opposite sides of the machine frame upon a pivot shaft 394, outwardly of the rear end member 326 of the carriage frame 322. Pivot linkages 396 and 398 secure the free ends of the arms 390 and 392 to bearing blocks 400 and 402 at the opposite ends of the frame rear end member 326. A pair of pneumatic operating cylinders 404 and 406 are secured at their base ends to the machine frame 310 by means of pivot links 408, and provide actuating rods 410 which are pivotally connected at their free ends to the corresponding pivot arms 390 and 392. In this way, simultaneous actuation of the cylinders 404 and 406 effects elevation or lowering of the entire carriage frame 322 in a pivotal manner about the shaft 332.

Referring now more particularly to FIGURE 20 of the drawing, the electrical circuitry for the pan unstacking machine 300 will be described. Power supply lines P1, P2, and P3, having a main disconnect switch and associated line fuses 200, provide current to a three phase motor M for power drive of the in-feed conveyor 306. A transformer 202 transmits power from lines P1 and P2 to main circuit lines L1 and L2. A master "on-off" switch 204 is indicated with double sets of contacts in their "off" position. A master pilot light 206 serves to indicate energization of the main circuit lines. The circuitry thus far described employs the same reference numerals and operates in the same manner as heretofore described in connection with the stacking machine 10.

The various electrical components connected across the main lines L1 and L2 will be briefly described in groups. A plurality of manual switches permit independent control of the aautomatic machine operations. These switches include a pan release "on-off" switch 420, an in-feed conveyor "forward-reverse" selector switch 422, a skip-jog switch 424, an unloader jog switch 426, and an unloader "on-off" switch 428. An unloader pilot light 434, and a pan stack alarm bell 436 are also provided to facilitate manual supervision of the machine.

A plurality of relays are provided for circuit actuation of corresponding relay-controlled contacts or switches. Relays 1M and 2M regulate the forward and reverse actuation respectively of the in-feed conveyor motor M, through corresponding sets of reversing contacts 1MS and 2MS. Additional relays 1R, 2R, 3R, 4R and 5R similarly effect the regulation of corresponding switch contacts 1RS, 2RS, 3RS, 4RS, and 5RS. Motor overload relays 430 control corresponding overload switch contacts 432.

A plurality of limit switches are mounted upon the machine 300 for automatic actuation in accordance with the performance of specific operating functions, and are indicated in FIGURE 20 at 1–LS through 12–LS. Switches 1–LS and 2–LS are mounted upon the elevator lift platform, at opposite sides thereof, for engagement by the bottom pan of a stack delivered onto the elevator by the in-feed conveyor 306. These switches indicate the presence of a properly aligned pan stack on the elevator lift platform, preparatory to an unstacking operation, and serve to stop the drive operation of the in-feed conveyor and to initiate upward or lifting movement of the elevator. The in-feed conveyor will continue to run or "skid" below an askew stack until manually corrected by an operator. The skip-jog switch 424 permits manual starting of the elevator if the operator decides that a stack is only slightly askew and can be fed even though both of switches 1–LS and 2–LS are not engaged.

Switch 3–LS is mounted at one side of the frame 322, as on the tie member 331, and is tripped by the operation of the pan detector and ejector bar 380, in response to the presence of a pan upon the elevating platform at the pan unstacking operating level. The switch 3–LS includes a normally closed set of contacts which are held open when a pan is in its clamping position, and a normally open set of contacts which are held closed when a pan is in its clamping position. Switch 4–LS is carried by the carriage frame 322 at its forward end, as on the end member 326, and is a normally closed switch, which is engaged by the rear carriage portion 338 when in its pan clamping position over the elevator lift platform, and held open while the pan clamping jaws of the front and rear carriages are "open." Switch 5–LS is mounted upon the machine frame 310 at one side thereof, and is a normally open switch which is adapted to be engaged and closed by the carriage frame 322 when pivoted to its "up" position. The switch 5–LS serves to actuate return movement of the carriage 322 to the pan-discharge end of the machine overlying the conveyor 302. Switch 6–LS is also mounted on the machine frame 310, rearwardly of the switch 5–LS, and is of the double block type. The switch 6–LS includes a normally open set of contacts which are closed when the carriage 322 effects its pan transferring movement, and also a set of normally closed contacts which are held open when the carriage transfers. A suitable cam rail is carried by the carriage 322 for cooperative engagement with the switch 6–LS, and the operation of this switch is coordinated with the photocell unit PC. The photocell unit PC1 is mounted upon the machine frame 310 at the pan unstacking operating level so as to detect the presence of the uppermost pan of a pan stack when in pan clamping position for removal and transfer.

Switch 7–LS is secured to the carriage frame 322 at its rear end, as on the end member 324, for engagement by the front carriage 336 when it has moved to its pan discharge position, and serves to actuate opening movement of the pan clamping jaws for release of an unstacked pan onto the conveyor 302. The switch 7–LS is a normally closed switch, which is opened when engaged by the front carriage 336. Switch 8–LS is also mounted upon the carriage frame 310 at its rear end, as on the end member 324, and is struck by the front carriage 336 after engagement of the switch 7–LS. The switch 8–LS is normally closed, and is opened when the carriage has completed a transfer movement, and serves to actuate return of the carriage to its position overlying the elevator lift platform for clamping and unstacking of the next pan. Switch 9–LS is mounted on the carriage frame 322 at its forward end, as on the end member 326, for engagement by the rear carriage portion 338 when it is in its open and pan clamping position over the elevator lift platform. The switch 9–LS is a normally closed switch, and is opened by the rear carriage to effect a stopping of the reciprocable carriages over the next pan to be unstacked and transferred.

Switch 10–LS is secured to the machine frame at the upper end of the elevator structure for cooperating engagement with the elevator lift platform when in its uppermost position after the last pan of a stack has been transferred therefrom. The switch 10–LS is a normally closed one, which is opened by engagement with the elevator lift platform, and serves to effect return of the elevator lift platform downwardly to its lowermost position when empty. Switch 11–LS is mounted at the bottom of the machine frame for engagement by the elevator lift platform when it is in its lowermost position. The switch 11–LS is a normally closed switch which is opened when engaged by the elevator lift platform, and serves to actuate driving movement of the in-feed conveyor 306 for delivering a pan stack onto the empty elevator lift platform. Switch 12–LS is a normally closed switch mounted in cooperative relation with the in-feed conveyor 306 so as to be held open by a stack of pans when supported upon the in-feed conveyor traveling level. The switch 12–LS serves to ring the alarm bell 436 to indicate that the in-feed conveyor is empty and a new supply of pans is required by the machine 300.

A plurality of solenoids are provided for actuating and controlling the pneumatic components of the machine. The various solenoids are indicated at 1S through 8S. Solenoid 1S regulates the main air supply. Solenoid 2S is energized when limit switches 1–LS and 2–LS have been made, and serves to operate a valve-air valve for actuation of the hydraulic operating cylinder of the elevator lift platform. Cooperating solenoids 3S and 4S control opening and closing, respectively, of oil valves for regulating the raising and lowering movements of the elevator lift platform in accordance with the automatic sequence of operations of the machine. Solenoid 5S controls pneumatic energization of the carriage lift cylinders 404 and 406. Solenoid 6S controls pneumatic energization of the operating cylinder 350 which effects forward and return transferring movement of the carriage frame 322. Solenoid 7S controls pneumatic energization of the operating cylinders 360 and 362 which effect opening and closing movement of the front carriage 336 relative to the rear carriage portion 339. In this way the "clamping jaws" are opened and closed. Solenoid 8S is energized by manual closing of the pan release "on-off" switch 420, for independent and manual pneumatic operation of the carriage lift cylinders 404 and 406.

The combination pneumatic oil system which provides power for the various mechanical operations of the pan unstacking machine 300 is substantially identical to the ararngement shown in FIGURE 12 of the drawing with respect to the pan stacking machine 10. Operation and actuation of the hydraulic operating cylinder for the elevator lift platform is identical for both machines, and the only differences in circuitry relate to the number and intended function of the various pneumatic valve operating solenoids. Accordingly, the pneumatic oil system of the pan unstacking machine 300 will be readily understood by those skilled in the art by reference to the disclosure relating to the pan stacking machine 10.

The practical operation of the pan unstacking machine 300 will now be briefly summarized. A supply of pans P will be carried by the normal continuous power drive of the in-feed conveyor 306 into the machine and onto the elevator lift platform. Normally, the elevator lift platform will be in its lowermost position and in proper alignment slightly below the traveling level of the in-feed conveyor 306 for receiving the first stack of pans to be supported thereon. When a stack of pans has been delivered onto the elevator lift platform, and in proper alignment thereon, limit switches 1–LS and 2–LS will cause the elevator to raise the pan stack until the uppermost pan is in proper alignment at the pan unstacking operating level. The uppermost pan will then be disposed intermediate the front and rear carriages 336 and 339, at the beam level of photocell unit PC, and the entire carriage frame 322 will be in its normal and substantially horizontal position, as seen in FIGURE 16. The proper positioning of the clamping jaws in their open relation, and the presence of a pan awaiting gripping engagement thereby, will serve to operate limit switches 3–LS and 4–LS and thereby automatically actuate closing or clamping movement of the carriage jaws against the pan P. When the jaws have been closed, the forward end of the carriage frame will be elevated, pivoting the entire carriage about its rear end at the shaft 332 and actuating limit switch 5–LS. In this way, the clamped pan will be lifted upwardly free of the pan immediately therebelow and free of the elevator lift platform. The front and rear carriages will then transfer simultaneously along the tilted carriage frame 322, as seen in FIGURE 17 of the drawing, until the pan has been transferred to a position overlying the conveyor 302. Limit switch 6–LS will be actuated during transfer, and the clamping jaws will then be automatically moved to their open positions for releasing the pan and discharging it onto the conveyor 302. Limit switches 7–LS and 8–LS will be actuated, and the front and rear carriages, still in open relation, will then effect a return movement forwardly to a position again overlying the elevator lift platform and the next pan of the stack. Such return movement will be performed with the carriage 322 in its raised or tilted position, since the elevator lift platform has meanwhile been actuated by limit switch 5–LS and photocell PC to move upwardly one pan-height increment bringing the next pan into clamping position. The forward end of the carriage frame 322 will then be pivotally lowered to its normally horizontal position preparatory to clamping closure of the jaws against the next pan. The cycle of operations will be continuously repeated until all of the pans of the stack have been removed from the elevator platform and transferred across to the conveyor 302. The empty elevator lift platform will then be lowered to its initial stack receiving position, actuating limit switch 11–LS, whereupon the in-feed conveyor will again be power driven and the next successive pan stack fed onto the elevator lift platform for continuous performance of the pan unstacking cycle of operations.

It will be apparent that the pan unstacking machine 300 will continue to perform in the manner heretofore described as long as pan stacks are supplied to the machine, or until any of its operations are manually interrupted or overridden by a machine operator. The pan unstacking machine, therefore, is fully automatic in its operation.

*Combination Pan Stacking and Unstacking System*

In FIGURES 21 and 22 of the drawing we have illustrated two typical system layouts for commercial bakery installations, wherein the pan stacking and pan unstacking equipment and principles of the present invention are utilized. The pan stacking machine 10 and the pan unstacking machine 300 have been shown and described as adapted for use with manually-operated pan stack handling equipment cooperating with the in-feed and out-feed conveyors, respectively, of the machines. The hand truck 308 of FIGURE 13 is typical, and the system installation of FIGURE 21 of the drawing contemplates the fixed installation of a pan stacker constructed in accordance with the machine 10 and a pan unstacker constructed in accordance with the machine 300, each installed along a main conveyor run at the pan control station of the bakery system. The removal of pan stacks from the pan stacking machine, and the introduction of pan stacks into the pan unstacking machine, as well as the storage and selection of the desired pan stacks, is performed by manual hand truck equipment. In FIGURE 22 the pan stacker and pan unstacker are also operative along the main conveyor run which in this instance is deemed to comprise both conveyor portions extending transversely to the pan storage conveyors as well as the portion extending parallel to and beyond the pan storage conveyors. Thus the terms "main conveyor means" as used in the subjoined claims include a branch of the main conveyor such as the branch in FIGURE 22 along which the pan unstacker operates.

The layout of FIGURE 21 is intended to be illustrative of a typical commercial bakery floor plan. Pans of a pre-selected size and shape are filled with the comestible to be baked and are delivered to the automatic loader of a large tray oven apparatus. The pans are continuously conveyed through the tray oven as the baking operation is performed, and are then discharged adjacent the entry end for delivery to automatic de-panning equipment which separates the baked goods from the pans. The baked goods are then conveyed along one conveyor to a cooler unit, from which the baked goods may be transferred to various automatic equipment for wrapping and labeling. The hot and empty pans are carried along another conveyor toward the pan control station. This series of pans will be automatically handled by the pan stacking machine, and deposited in stacks of predetermined height upon the out-feed conveyor thereof. After a predetermined full load of stacks has been deposited on the out-feed conveyor of the pan stacker, the operator will remove the group of stacks by means of a hand truck and transfer them to an adjacent pan storage area. The same operator will select loaded trucks from the storage area having pans of the appropriate size for the next baking operation and introduce them onto the in-feed conveyor of the pan unstacking machine, from which the pans will be consecutively deposited upon the main conveyor for delivery to a greaser unit which lubricates the inner pan surfaces preparatory to the depositing of dough by a moulder unit and delivery of the pans to various proofing, fermentation and storage areas. The loaded pans may then be introduced into the tray oven to again follow the baking cycle of operations.

In operating hand trucks with the pan stacking and pan unstacking machines of the present invention, it is contemplated that a single operator will be capable of maintaining an efficiently regulated pan control station for large scale bakery operations. The operator will set the pan unstacker for the number of stacks that the particular truck equipment will accommodate, normally about 5 stacks, and the automatic stepping switch circuitry of the machine will cause the signal bell to indicate the completed formation of the stacks upon the out-feed conveyor. The operator may then straddle the out-feed conveyor with the fork or side rails of the hand truck below the traveling level of the conveyor and the pan stacks thereon. Appropriate manual elevating and lowering of the out-feed conveyor of the pan stacking machine will serve to deposit the pan stacks onto the hand truck and permit their removal and conveyance upon the truck to the storage area. The pan stacking machine will then continue its automatic operation.

A normal maximum production rate for most commercial bakery installations is about 25 pan sets or straps per minute. If 5 stacks of 25 pans each are to be deposited upon each hand truck, the operator would be required to remove one truck load every 5 minutes. The manual removal operation with the hand truck requires at most about 15 seconds to perform. A similar time period is necessary for delivering a set of pan stacks by means of the hand truck to the pan unstacking machine. It will be apparent that a single operator can efficiently handle both the stacking and unstacking machines and still have adequate time to manipulate trucks in the pan storage area.

The relation between the hand truck and the in-feed conveyor of the pan unstacking machine is substantially identical to that of the pan stacking machine, except that the cycle is reversed and a plurality of pan stacks are delivered from the truck to the in-feed conveyor. The pan unstacking machine will automatically respond to signal the absence of pan stacks upon its in-feed conveyor, and thereby advise the operator that the pan supply has been depleted and permit the delivery of another full truck of pans for transfer onto the in-feed conveyor.

In FIGURE 22 of the drawing, we have illustrated an alternative system layout which contemplates the elimination of all manual operations between the pan stacker and the pan unstacker. The over-all system installation is substantially the same as that of FIGURE 21 except as to the relative locations of the pan stacker and the pan unstacker, and the utilization of the pan storage area by means of a plurality of selectively driven pan storage conveyors arranged in parallel relation. It is contemplated that each of the pan storage conveyors may be utilized for a different type of pan to be used in the baking system. The over-all length of the pan storage conveyors would be determined by the actual number of pans which must be stored between baking operations. It is important that the pan stacking and unstacking machines be located at opposite ends of the pan storage conveyors, and it is preferable that the conveyors be arranged in straight lengths so as to avoid the difficulties of handling the tall stacks upon sharp turns of an automatically driven conveyor. Bakeries of average production size will ordinarily require total pan storage conveyor lengths of about 100 feet.

In contrast to the fixed position of the pan stacking and pan unstacking machines at the pan control station of FIGURE 21, the respective machines in the installation of FIGURE 22 must be laterally movable transversely of the entry and discharge ends of the conveyors. Instead of manually bringing pan trucks to each machine, the respective machines will be moved to a position of cooperation with a proper pan storage conveyor. In order to do this, it is merely necessary that the machines 10 and 300 of the present disclosure be mounted upon wheels for travel along fixed tracks disposed perpendicular to the direction of travel of the pan stacks upon the pan storage conveyors.

In actual practical operation, it is necessary to be able to deliver pans from the pan stacker onto a given pan storage conveyor at one rate of speed, while simultaneously making pans available from another pan storage conveyor to the pan unstacking machine at a different rate of speed. In addition, the number of pans on any particular pan storage conveyor may vary at any given time from zero to the maximum storage number. Although the simplicity of gravity or accumulating type conveyors is a desirable factor, the high center of gravity of the pan stacks tends to render them relatively unstable for such handling. Due to the substantial weight of the stacks, and the large total number which a pan storage conveyor may be required to support, a continuously powered conveyor which would allow the pans to skid or be stopped while the conveyor continues to run would also not be satisfactory because of the excessive wear to the bottom pans of each stack and the extreme pressure at the inlet end to the pan unstacking machine. We contemplate, therefore, the utilization of generally horizontal apron conveyors utilizing gravity rollers having a very slight frictional drag which is just sufficient to convey a stack of pans but able to roll whenever any obstruction to the movement of the stacks is encountered. An alternative method would be to use a conventional gravity conveyor having a flight conveyor superimposed thereon and spring loaded so as to be operative only up to a force sufficient to move a pan stack across the gravity conveyor. A still further alternative would be to install conveyors each comprising independently powered multiple sections. For example a section immediately adjacent the pan stacker, a section immediately adjacent the pan unstacker, and an intermediate center section would each be provided with separate drives for forward, reverse or stop regulation.

In any pan storage conveyor utilized in combination with the pan stacking and unstacking equipment of this invention, three important requirements must be met. Pan stacks must always be available immediately at the pan unstacker. There must be a free conveyor space forwardly of the pan stacker at all times to receive pan stacks therefrom. The pan stacks must be handled in a stable manner and not subjected to excessive wear or abrupt movements.

Such pan storage conveyors would be automatically actuated by external sensing or "feeler" switches located at the opposite ends of the conveyors and connected with the electrical circuitry of the corresponding pan stacking and unstacking machines. For example, such an external sensing switch would be located in the pan stacker circuitry of FIGURE 11 intermediate the main line L1 and the switch 224. Similarly, in the pan unstacker circuitry of FIGURE 20 such a switch would be located intermediate the main line L1 and the switch 428.

Normally, any pan stacks on the storage conveyors would be stored in front of the pan unstacking machine. In the case of an installation having a series of three separately driven conveyor sections, any excess pan stacks would normally be stored on the center conveyor section at the end thereof nearest the pan unstacker. As soon as the inlet conveyor section in front of the pan stacker approaches loaded capacity, the center section would be automatically actuated in reverse until the stacks thereon nearest the pan stacker reached the near or stacker end of the center section. If the pan stacker section still was not full, it would then be driven forwardly until the gap between the pan stacks on the inlet section and on the center section was eliminated. At this time, both the inlet section and the center section would be driven forwardly simultaneously until the leading stack reached the far or unstacker end of the center section. The outlet conveyor section in front of the pan unstacker would then be driven in reverse to close the gap between the pan stacks on the outlet section and the pan stacks on the center section. The outlet section as well as the center conveyor, and the inlet section also if pan stacks are present on it, would then be driven forwardly simultaneously until the outlet conveyor is again full. This cycle of reversing drives would be continuously repeated as required to maintain the system in operation. The essence of the multiple conveyor section structure for a pan storage conveyor is to provide a series of conveyors having feeler switches mounted at both ends of each section to detect the presence of pan stacks, and having suitable controlling means to drive the respective conveyors in forward or reverse directions as necessary. In this way, gaps between stacks on the respective conveyor sections will be eliminated, and pan stacks will not be disposed at both ends of any conveyor section with an absence of stacks therebetween.

It will be understood that a variety of automatic conveying devices may be utilized for selectively conveying pan stacks between the pan stacking machine and the pan unstacking machine within the basic principles and concepts of the present invention.

In describing the construction of the pan stacking machine 10 and the pan unstacking machine 300, the conveyors 12 and 302 have been described as terminating and beginning, respectively, at each of the said machines. This is a convenient conveyor arrangement for hand-truck operation where the particular plant layout is more conveniently accommodated by a discontinuity in the main conveyor run leading to the pan control station. In both FIGURES 21 and 22 of the drawing, however, the main conveyor is illustrated as being continuous and movable forwardly between the pan stacking and unstacking machines. For example, the conveyor of FIGURE 12 would be an integral continuation with the conveyor 302 of FIGURE 13. In such installations. the area embraced by the stacking and unstacking machines may be termed a pan control station and the automatic operations of the stacking and unstacking machines may be readily coordinated through the use of supplemental selector switches at a pan flow control zone located forwardly of the pan unstacking machine and rearwardly of the dough-depositing equipment.

In practice, three selector switches may be provided at successive positions between the pan unstacking machine and the greaser and moulder equipment. These are conventional switches such as the Square D pneumatic switch, Class 9050, Type AO–IE. The first of these switches would be a maximum pan supply or position switch $S_{11}$ (FIGURE 21), the next a normal position switch $S_{12}$, and the last a minimum position switch $S_{13}$.

When an entirely new type of pan is to be introduced by the pan unstacking machine 300, in any continuous conveyor arrangement utilizing selector switches forwardly of the pan unstacking machine, all pans delivered to the pan stacking machine will be stacked and removed. If the rate of operation of the pan unstacking machine should exceed the rate of reception of pans by the moulder equipment, it will be apparent that pans will back up along the main conveyor at the pan flow control zone, and the absence of gaps between pans may be readily detected by an appropriate maximum position selector switch $S_{11}$. This switch would then serve to discontinue the operation of the unstacking machine, and hence the introduction of pans onto the main conveyor, until the backlog of pans was sufficiently relieved by delivery to the moulder.

Where the same pans are to be re-used in any continuous conveyor arrangement utilizing selector switches, the maximum position switch $S_{11}$ would be responsive to initiate operation of the stacking machine when a maximum pan condition is present at the pan flow control zone forwardly of the pan unstacking machine. The normal position switch $S_{12}$ intermediate the maximum and minimum position switches $S_{11}$ and $S_{13}$, respectively, would operate when clear to stop the pan stacking machine in response to the presence of a normal pan supply rearwardly of the moulder equipment. The minimum position switch $S_{13}$ would be operative to start the unstacking machine in response to a pan supply below the necessary minimum requirement. The normal position switch $S_{12}$ would serve when interrupted by a proper pan supply to stop the unstacking machine.

When the operation of the pan stacking machine is discontinued in response to the normal pan supply conditions described above, the sensing gate assembly would be automatically elevated to its inoperative position, as indicated in dot-dash line on FIGURE 7, to permit pans to pass freely past the stacking machine toward the moulder equipment.

It will be apparent that the coordinated automatic response of the automatic stacking and unstacking machines disclosed herein may be readily adapted for a wide variety of continuous conveyor installations in accordance with both normal cycle and unusual load conditions of the various coordinated equipment being served by the conveyor system. While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. In a pan conveying system for stackable baking pans, a continuously moving main conveyor operative to carry forwardly a consecutive series of stackable pans to and beyond a pan control station, first automatic means at the rearward end of said control station positioned in cooperating partially-overlying relation to said main conveyor and operative to sense pans as they are delivered thereto in consecutive series and effect their successive lateral removal from said main conveyor and onto an elevator lift platform, said platform being responsive to lateral pan delivery thereto to move downward one pan height thereby to enable stacking of a pan stack of predetermined height thereon, said first means including a discharge conveyor disposed at least one full stack height below said main conveyor and operative to transfer full pan stacks from said elevator lift platform as formed for removal and storage preparatory to re-use, second automatic means positioned forwardly of said first means at the forward end of said control station in cooperating partially-overlying relation to said main conveyor and operative to unstack pans from full stacks and effect their succesive lateral delivery onto said main conveyor forwardly of said first means from an elevator lift platform, said platform being responsive to lateral pan removal therefrom to move upward one pan height thereby to enable unstacking of a pan stack supported thereon, said second means including an inlet conveyor disposed at least one full stack height below said main conveyor and operative to transfer full pan stacks thereto, and sequence control means forwardly of said second means operative to sense the pan supply on said main conveyor forwardly of said pan control station and effect selected initiation and interruption of the operations of said first and second means to maintain a desired rate of delivery of pans of a predetermined type by said main conveyor forwardly of said pan control station.

2. An automatic machine for unstacking a stack of nested pans and adapted to be positioned in cooperating relation to a continuously moving main conveyor operative to carry a consecutive series of nestable pans, said machine comprising elevator means having a lift platform movable between upper and lower limiting positions, a transfer carriage frame above said elevator means having its one end pivotally fixed and having its other end vertically reciprocable at least a distance corresponding to the height of one pan, a carriage transversely reciprocable upon said frame from a first position overlying the upper limiting position of said elevator lift platform to a second position overlying said main conveyor, said carriage providing a pair of gripping jaws mounted for relative opening and closing cooperation, pan sensing means disposed between said gripping jaws and responsive to the presence of a pan at said upper limiting position and operative to initiate pan gripping and transfer, and drive means for successively raising said elevator lift platform in increments of one pan height to deliver the uppermost pan of a nested pan stack disposed thereon to said upper limiting position, for closing said gripping jaws into engagement against a pan when said carriage is in its first position and a pan is detected by said sensing means, for upwardly tilting said frame about its pivot to effect removal and clearance of a gripped pan, for moving said carriage and a pan held within its gripping jaws to its second position, for opening said gripping jaws to release a pan onto the main conveyor, for returning said carriage to its first position while said jaws remain open and while said frame remains tilted, and for lowering said frame, all in a continuously cyclical sequence in response to the provision of pan supply upon said elevator lift platform.

3. In a pan conveying system for stackable baking pans; main conveyor means operative to carry forwardly a consecutive series of stackable pans to and beyond a pan control station; first automatic means near the rearward end of said control station positioned in cooperating adjacent relation to said main conveyor means and operative to sense pans as they are delivered thereto in consecutive series and effect their lateral removal from said main conveyor means and onto an elevator lift platform, said platform being responsive to lateral pan delivery thereto to move downward one pan height thereby to enable stacking of a pan stack of predetermined height thereon, said first automatic means including discharge conveyor means disposed at least one full stack height below said main conveyor means and operative to transfer full pan stacks from said elevator lift platform as formed for removal and storage preparatory to re-use; second automatic means positioned downstream of said first automatic means in cooperating partially-overlying relation to said main conveyor means and operative to unstack pans from full stacks and effect their successive lateral delivery onto said main conveyor means downstream of said first automatic means from an elevator lift platform, said platform being responsive to lateral pan removal therefrom to move upward one pan height thereby to enable unstacking of a pan stack supported thereon, said second automatic means including an inlet conveyor means disposed at least one full stack height below said main conveyor means and operative to transfer full pan stacks thereto, and control means operative to sense the pan supply on said main conveyor means downstream of said second automatic means and to operate said first and second automatic means conjunctively, or one of the two independently of the other to maintain a desired rate of delivery of pans of a predetermined type by said main conveyor means forwardly of said pan control station.

4. In a pan conveying system for stackable baking pans; main conveyor means operative to carry forwardly a consecutive series of stackable pans to and beyond a pan control station; pan stacking means, including an elevator lift platform near the rearward end of said control station positioned in cooperating adjacent relation to said main conveyor means; transfer means for effecting the lateral removal of pans from said main conveyor means and onto said elevator lift platform; said platform being movable downward one pan height incrementally to enable stacking of a pan stack of predetermined height thereon; means for sensing the arrival of pans on said main conveyor means and operating said transfer means; means for disabling said sensing means to permit said pans to proceed past said transfer means without being removed to said elevator lift platform; unstacking means positioned forwardly of said pan stacking means in cooperating relation to said main conveyor means and operative to unstack pans from full stacks and effect their successive lateral delivery onto said main conveyor means downstream of said pan stacking means from an elevator lift platform, said platform being movable upward incrementally one pan height to enable unstacking of a pan stack supported thereon; and control means for operating said stacker and unstacker conjunctively or one of the two independently of the other to maintain a desired rate of delivery of pans of a predetermined type by said main conveyor means forwardly of said pan control station.

5. In a pan conveying system for stackable baking pans; main conveyor means operative to carry forwardly a consecutive series of stackable pans to and beyond a pan control station; first automatic means, including an elevator lift platform, near the rearward end of said control station positioned in adjacent relation to said main conveyor means and operative to sense pans as they are delivered thereto in consecutive series and effect their successive lateral removal from said main conveyor means and onto said elevator lift platform, said platform being movable downward incrementally one pan height to enable stacking of a pan stack of predetermined height thereon; second automatic means, including an elevator lift platform, positioned downstream of said first means in cooperating adjacent relation to said main conveyor means and operative to unstack pans from full stacks and effect their successive lateral delivery onto said main conveyor means upstream of said first means from an elevator lift platform, said second automatic means including pan gripping means movable downwardly to grip the top pan on the elevator lift platform upwardly to clear any pans below and laterally to said main conveyor means; said platform being movable upwardly incrementally one pan height to enable unstacking of a pan stack supported thereon; and control means permitting operation of the first and second automatic means to effect initiation and interruption of the operation thereof to maintain a desired rate of delivery of pans of a predetermined type by said main conveyor means downstream of said pan control station.

6. The combination defined in claim 5 in which said first and second automatic means are mounted for relative movement along said main conveyor means and pan storage conveyors are provided therebetween.

7. The combination defined in claim 6 in which said pan storage conveyors extend lengthwise substantially perpendicularly to the paths of movement of said first and second automatic means.

8. An automatic machine for unstacking a stack of nested pans and adapted to be positioned in cooperating relation to continuously moving main conveyor means operative to carry a consecutive series of nestable pans, said machine comprising elevator means having a lift platform movable between upper and lower limiting positions, a transfer carriage frame above said elevator means mounted for up and down movement a distance corresponding substantially to the height of one pan, a carriage transversely travelable upon said frame from a first position overlying the upper limiting position of said elevator lift platform to a second position overlying said main conveyor means, said carriage providing a pair of gripping jaws mounted for relative opening and closing cooperation pan sensing means disposed between said gripping jaws and responsive to the presence of a pan at said upper limiting position and operative to initiate pan gripping movement of said jaws; and drive means for successively raising said elevator lift platform increments of one pan height to deliver the uppermost pan of a nested pan stack disposed thereon to said upper limiting position, for initiating closing of said gripping jaws into engagement against a pan when said carriage is in its first position and a pan is detected by said sensing means, for moving said frame upwardly to effect removal and clearance of a gripped pan, for moving said carriage and a pan held within its gripping jaws to its second position, for initiating opening of said gripping jaws to release a pan onto the main conveyor means, for returning said carriage to its first position while said jaws remain open, and for lowering said frame, all in a cyclical sequence in response to the provision of a pan supply upon said elevator lift platform.

References Cited in the file of this patent
UNITED STATES PATENTS

| 1,703,637 | Reifsnyder | Feb. 26, 1929 |
| 1,704,318 | Gregory | Mar. 5, 1929 |
| 1,978,004 | Winkley | Oct. 23, 1934 |
| 2,077,830 | Failinger | Apr. 20, 1937 |
| 2,412,137 | Fink | Dec. 3, 1946 |
| 2,510,573 | Gray | June 6, 1950 |
| 2,598,222 | Cahners et al. | May 27, 1952 |
| 2,600,038 | Whaley | June 10, 1952 |
| 2,627,354 | Isella et al. | Feb. 3, 1953 |
| 2,661,102 | Trigwell | Dec. 1, 1953 |
| 2,698,693 | Nordquist | Jan. 4, 1955 |
| 2,729,344 | Birchall | Jan. 3, 1956 |
| 2,752,050 | Nordquist | June 26, 1956 |
| 2,763,229 | Sahlin | Sept. 18, 1956 |
| 2,774,489 | Guigas | Dec. 18, 1956 |
| 2,873,020 | Kay | Feb. 10, 1959 |
| 2,980,265 | Johnson | Apr. 18, 1961 |

FOREIGN PATENTS

| 700,976 | Great Britain | Dec. 16, 1953 |